(12) United States Patent
Lachambre et al.

(10) Patent No.: US 9,916,227 B2
(45) Date of Patent: Mar. 13, 2018

(54) SYSTEMS AND METHODS FOR ANALYZING SOFTWARE COMPATIBILITY

(71) Applicant: Citrix Systems, Inc., Fort Lauderdale, FL (US)

(72) Inventors: Sheldon Ferdinand Lachambre, London (GB); David Greggory Thornley, Algonquin, IL (US); Todd Joseph Rosenthal, Menlo Park, CA (US); Tienfeng Chang, Tainan (TW)

(73) Assignee: Citrix Systems, Inc., Fort Lauderdale, FL (US)

( * ) Notice: Subject to any disclaimer, the term of this patent is extended or adjusted under 35 U.S.C. 154(b) by 314 days.

(21) Appl. No.: 14/704,740

(22) Filed: May 5, 2015

(65) Prior Publication Data
US 2015/0317235 A1    Nov. 5, 2015

Related U.S. Application Data

(60) Provisional application No. 61/988,697, filed on May 5, 2014.

(51) Int. Cl.
*G06F 9/45* (2006.01)
*G06F 11/36* (2006.01)

(52) U.S. Cl.
CPC ...... *G06F 11/3672* (2013.01); *G06F 11/3612* (2013.01); *G06F 11/3664* (2013.01); *G06F 11/3668* (2013.01)

(58) Field of Classification Search
CPC ............ G06F 11/3668; G06F 11/3612; G06F 11/3664; G06F 11/3672
USPC ........................................................ 717/126
See application file for complete search history.

(56) References Cited

U.S. PATENT DOCUMENTS

| | | | |
|---|---|---|---|
| 5,974,254 A | 10/1999 | Hsu | |
| 6,366,876 B1 | 4/2002 | Looney | |
| 2004/0210885 A1 | 10/2004 | Wang et al. | |
| 2005/0028143 A1 | 2/2005 | Aridor et al. | |
| 2006/0015807 A1 | 1/2006 | Chellis et al. | |
| 2006/0184917 A1* | 8/2006 | Troan | G06F 11/2289 717/124 |
| 2008/0301639 A1 | 12/2008 | Bell et al. | |
| 2010/0100772 A1* | 4/2010 | Troan | G06F 11/3688 714/38.1 |
| 2010/0235823 A1 | 9/2010 | Garbers et al. | |

(Continued)

OTHER PUBLICATIONS

International Search Report and Written Opinion dated Sep. 30, 2014; PCT Application PCT/US2013/072696; 10 pages.

(Continued)

*Primary Examiner* — John Chavis
(74) *Attorney, Agent, or Firm* — Foley & Lardner LLP; Christopher J. McKenna

(57) ABSTRACT

Computer-implemented systems, methods, and computer-readable media are provided for facilitating analysis of a software application to determine its compatibility with one or more computer platforms. In accordance with some embodiments, a processor may receive, via an operator interface, a selection of an application and a user identity, and the processor may determine compatibility status between the application and at least one computing platform of a device associated with the user identity, and generate a report with the compatibility results.

20 Claims, 33 Drawing Sheets

(56) References Cited

U.S. PATENT DOCUMENTS

| | | |
|---|---|---|
| 2010/0241469 A1* | 9/2010 | Weigert .................... G06F 8/75 |
| | | 717/124 |
| 2010/0333068 A1 | 12/2010 | Niimura et al. |
| 2011/0321014 A1* | 12/2011 | Nagoria .............. G06F 11/2289 |
| | | 717/125 |
| 2012/0210294 A1 | 8/2012 | Gores |
| 2013/0152046 A1 | 6/2013 | Salecker et al. |
| 2014/0297592 A1 | 10/2014 | Ohtake et al. |
| 2014/0380341 A1 | 12/2014 | Geimer et al. |
| 2015/0154277 A1 | 6/2015 | Thornley et al. |
| 2015/0169319 A1 | 6/2015 | Ahmed et al. |
| 2015/0169320 A1 | 6/2015 | Ahmed et al. |
| 2015/0178072 A1* | 6/2015 | Bektas ................ G06F 9/44578 |
| | | 717/123 |
| 2015/0261653 A1 | 9/2015 | Lachambre et al. |

OTHER PUBLICATIONS

International Search Report and Written Opinion dated Jun. 2, 2015; PCT Application PCT/US2015/019766; 9 pages.

O'Donnell, G; "Smarts Application Discovery Manager 5.0: Accelerating ServerData Center Consolidations, Application Migrations, and CMDB Projects"; Jan. 1, 2007; Presentation at EMC World Conference; Orlando, Florida; pp. 5, 11-13.

Citrix Systems Inc.; "AppDNA 6.1 Advanced Feature Guide"; 2012; 84 pages.

Citrix Systems Inc.; "AppDNA 6.1 Basic User Guide"; 2012; 86 pages.

* cited by examiner

FIG. 23

| Application view | System view | Project ABCD Report | Search | Filters ▽ | | Welcome Steve | Log Off | Help ▽ |
| | | | | | | Import | Upgrade | Remove |

Show All
✓Windows Vista_docx — 4
✓Windows XP_Certifica — 2
 Windows 7_Pool — 2
 Windows 8_Redacted — 2

Word 2013, 6.0.1    4 Users
Microsoft            Groups

| Windows 7 | WinServer 2012 | Windows 8 | XenApp Sta |
| 10 issues to fix | 2 issues to fix | 2 issues to fix | 1 issues to fix | tested on 06/10/2013

Show All
✓Windows Vista_Foor — 2
✓Windows XP_Dedicated — 2
 Windows 7_Faol — 2

Corel Photo Paint 6   2 Users
Corel Corporation     Groups

| Windows 7 | WinServer 2012 |
| 3 issues to fix | 2 issues to fix | tested on 06/07/2013

Show All
✓Windows 7_Dedicated — 2
✓Windows 9_Dedicated — 2
✓App stream — 2

Visio Standard 2013   2 Users
Microsoft             Groups

No system issues to fix. Ready for testing.

tested on 06/20/2013

| Manage ▽ | | | | | Welcome Steve | Log Off | Help ▽ |

Project ABCD Report

| Application view | System view | | Search | Filters ▽ | | Import | Upgrade | Remove |

| | | 2410 | | | |
|---|---|---|---|---|---|
| Word 2013. 6.0.1 | 4 Users | Show All | Vista_docx | 4 | |
| Microsoft | Groups | Finance | XP_Certifica | 2 | |
| | | Marketing | 7_Pool | 2 | |
| | | Help Desk | Windows 8_Redacted | 2 | |
| | | Management | | | |

| Windows 7 | WinServer 2012 | Windows 8 | XenApp Sta |
|---|---|---|---|
| 10 issues to fix | 2 issues to fix | 2 issues to fix | 1 issues to fix | tested on 06/10/2013

| Corel Photo Paint 6 | 2 Users | Show All | |
|---|---|---|---|
| Corel Corporation | Groups | ✓ Windows Vista_Foor | 2 |
| | | ✓ Windows XP_Dedicated | 2 |
| | | Windows 7_Faol | 2 |

| Windows 7 | WinServer 2012 |
|---|---|
| 3 issues to fix | 2 issues to fix | tested on 06/07/2013

| Visio Standard 2013 | 2 Users | Show All | |
|---|---|---|---|
| Microsoft | Groups | ✓ Windows 7_Dedicated | 2 |
| | | ✓ Windows 9_Dedicated | 2 |
| | | ✓ App stream | 2 |

No system issues to fix. Ready for testing.

tested on 06/20/2013

| Manage ▽ | | | | Welcome Steve [Log Off] [Help ▽] |
|---|---|---|---|---|
| Project ABCD Report | | | | [Import] [Upgrade] [Remove] |
| Application view | System view | [Search] [Filters ▽] | | |

[Show All] ⌐2530
Word 2013, 6.0.1   4 Users   ✓ Windows Vista_docx   4
Microsoft          Groups    ✓ Windows XP_Certifica  2
                             | Windows 7_Pool         2
                             Windows 8_ Redacted     2 tested on 06/10/2013

⌐2540
| Windows 7 | WinServer 2012 | Windows 8 | XenApp Sta |
|---|---|---|---|
| 10 issues to fix | 2 issues to fix | 2 issues to fix | 1 issues to fix |

[Show All]
Corel Photo Paint 6   2 Users   ✓ Windows Vista_Foor       2
Corel Corporation     Groups    ✓ Windows XP_Dedicated    2
                                Windows 7_Faol            2 tested on 06/07/2013

| Windows 7 | WinServer 2012 |
|---|---|
| 3 issues to fix | 2 issues to fix |

[Show All]
Visio Standard 2013   2 Users   ✓ Windows 7_Dedicated   2
Microsoft             Groups    ✓ Windows 9_Dedicated   2
                                ✓ App stream tested on 06/20/2013

No system issues to fix. Ready for testing.

| Manage ▽ | | | Welcome Steve | Log Off | Help ▽ |

Project ABCD Report | Import | Upgrade | Remove |

| Application view | System view | Search... | Filters ▽ |

Show All — 2550

Word 2013, 6.0.1   4 User    ✓ Windows Vista_docx    User Groups 4
Microsoft          Groups    ✓ Windows XP_Dedicated  2
                             ② Windows 7_Pool        2
                             ② Windows 8_Dedicated   2

— 2560

| Windows 7 | WinServer 2012 | Windows 8 | XenApp Sta |
| 10 issues to fix | 2 issues to fix | 2 issues to fix | 1 issues to fix | tested on 06/10/2013

Corel Photo Paint 6   2 User    Show All                          User Groups
Corel Corporation     Groups    ✓ Windows Vista_Foor  2
                                ✓ Windows XP_Dedicated 2
                                ② Windows 7_Faol      2

| Windows 7 | WinServer 2012 |
| 3 issues to fix | 2 issues to fix | tested on 06/07/2013

Visio Standard 2013   2 User    Show All                          User Groups
Microsoft             Groups    ✓ Windows 7_Dedicated  2
                                ✓ Windows 9_Dedicated  2
                                ✓ App stream No system issues to fix. Ready for testing.

tested on 06/20/2013

| | | | | Welcome Steve | Log Off | Help ▽ |

| Manage ▽ |

2615
Word 2013
Windows Vista            2623                                                    2635  2640  2645  2650

2660 — Mfg: Microsoft          Test Module: Virtualization Manager       App ID: 002
Test Image:                    2625
Default OS Image combination       Location: test.net\MSSource\OA\apps\TestDataMS\TestData_000\    Test Date: 06/11/2013
                                   Sync_1.2_p3.4_GLOBAL.MSI                                              — 2655

2665 — Issues to fix

! Machine Level Components

2670 — Manifestation: Drivers cannot be virtualized as they are not supported by the streaming feature.
2675 — Solution: Drivers should be moved from the virtual environment to the local OS build if their operation can be tested
        as successful running isolated on the target OS.
2680 — Group: Machine Level Components
2685 — Result:  Filename      Path                              Version #      Function
2690 —          AppMgr.exe    Program/Files/AppMgr.exe          3.7.0.3082     Function1
                AppMgr.exe    Program/Files/AppMgr.exe          3.7.0.3083     Function2
                AppMgr.exe    Program/Files/AppMgr.exe          3.7.0.3083     Function3
                AppMgr.exe    Program/Files/AppMgr.exe          3.7.0.3082     Function4
                AppMgr.exe    Program/Files/AppMgr.exe          3.7.0.3083     Function5
                AppMgr.exe    Program/Files/AppMgr.exe          3.7.0.3083     Function6

! Machine Level Components

Manifestation: Drivers cannot be virtualized as they are not supported by the streaming feature.
Solution: Drivers should be moved from the virtual environment to the local OS build if their operation can be tested

Group: Machine Level Components
Applications utilizing machine level components are potentially bad candidates as the operating systems do not
have access to the required resources.

2694                       2696
Result:    Filename        Path                       Version #    Function   2698
           AppMgr.exe      Program/Files/AppMgr.exe   3.7.0.3082   Function1
           AppMgr.exe      Program/Files/AppMgr.exe   3.7.0.3083   Function2
2692       AppMgr.exe      Program/Files/AppMgr.exe   3.7.0.3083   Function3
           AppMgr.exe      Program/Files/AppMgr.exe   3.7.0.3082   Function4
           AppMgr.exe      Program/Files/AppMgr.exe   3.7.0.3083   Function5
           AppMgr.exe      Program/Files/AppMgr.exe   3.7.0.3083   Function6

[ Machine Level Components ]
Manifestation: Drivers cannot be virtualized as they are not supported by the streaming feature.
Solution: Drivers should be moved from the virtual environment to the local OS build if their operation can be tested
as successful running isolated on the target OS.

Group: Machine Level Components
Result:    Filename        Path                       Version #    Function
           AppMgr.exe      Program/Files/AppMgr.exe   3.7.0.3082   Function1
           AppMgr.exe      Program/Files/AppMgr.exe   3.7.0.3083   Function2
           AppMgr.exe      Program/Files/AppMgr.exe   3.7.0.3083   Function3
           AppMgr.exe      Program/Files/AppMgr.exe   3.7.0.3082   Function4

[ Machine Level Components ]
Manifestation: Drivers cannot be virtualized as they are not supported by the streaming feature.
Solution: Drivers should be moved from the virtual environment to the local OS build if their operation can be tested
as successful running isolated on the target OS.

Group: Machine Level Components
Result:    Filename        Path                       Version #    Function
           AppMgr.exe      Program/Files/AppMgr.exe   3.7.0.3082   Function1

SYSTEMS AND METHODS FOR ANALYZING SOFTWARE COMPATIBILITY

PRIORITY CLAIM

This application claims priority from U.S. Provisional Application No. 61/988,697, filed May 5, 2014, which is hereby incorporated by reference in its entirety in the present application.

BACKGROUND

Users of computing devices today use a variety of applications, such as Microsoft Word and Microsoft Excel, and a variety of different operating systems, such as Windows 7 and Windows 8. Users also use a variety of different types of computing devices, such as personal computers, laptops, tablets, personal digital assistants (PDAs), personal organizers, mobile phones, smart-phones, and other devices.

This use of a variety of different applications, operating systems, and/or devices can create problems for administrators of networks, such as information technology (IT) departments. For example, different user groups, project teams, or individuals in such a managed network may have different types of computing devices using different types of operating systems. An administrator may need to determine the compatibility of an application with each type of device before installing the application on the devices. In an organization or network of individuals, this process must be repeated for each application and each device type in the organization/network. As users demand new and improved features, the frequency with which requests for new applications are received increases. Users also continue to use an increasingly varied number of operating systems and devices. Therefore, the process of determining whether applications are compatible with devices used by users of a network is becoming increasingly complicated.

Notwithstanding the above, it is critical that administrators be able to determine the compatibility of applications with the various devices used by users of a network. Unfortunately, each application can be associated with many different algorithms. Thus, verifying applications and their associated algorithms for any given device can be very complex and time consuming. Traditionally, such a determination of compatibility is made manually, costing the organization a significant number of man hours (or months or years) and cost. Furthermore, traditional methods are prone to errors resulting in poorly-functioning or nonfunctioning software and/or hardware.

While a number of current techniques can be used to detect compatibility of an application across different computing environments, the current techniques often involve manually testing applications using diagnostic tools such as process monitoring and debuggers to discover any defects. Such a process is time-consuming and requires specialized knowledge of the person in charge of the testing.

Accordingly, and in view of the foregoing, there is a need for systems and methods that are capable of testing platforms and applications to determine whether a particular application is compatible with a device used by a user of a network. There is also a need for determining the compatibility of multiple applications with a variety of different devices quickly, efficiently, and accurately. There is further a need for computerized solutions that overcome the drawbacks and limitations of conventional systems and methods for determining the compatibility of an application, to improve the functionality of software applications and the hardware on which they run, to reduce the rate of bugs and errors in computer systems and networks.

BRIEF DESCRIPTION OF THE DRAWINGS

Reference will now be made to the accompanying drawings showing exemplary embodiments of the disclosure. In the drawings:

FIGS. 12-26B are exemplary illustrations of exemplary operator user interfaces for implementing aspects of the disclosed embodiments.

DETAILED DESCRIPTION

Figure 1:
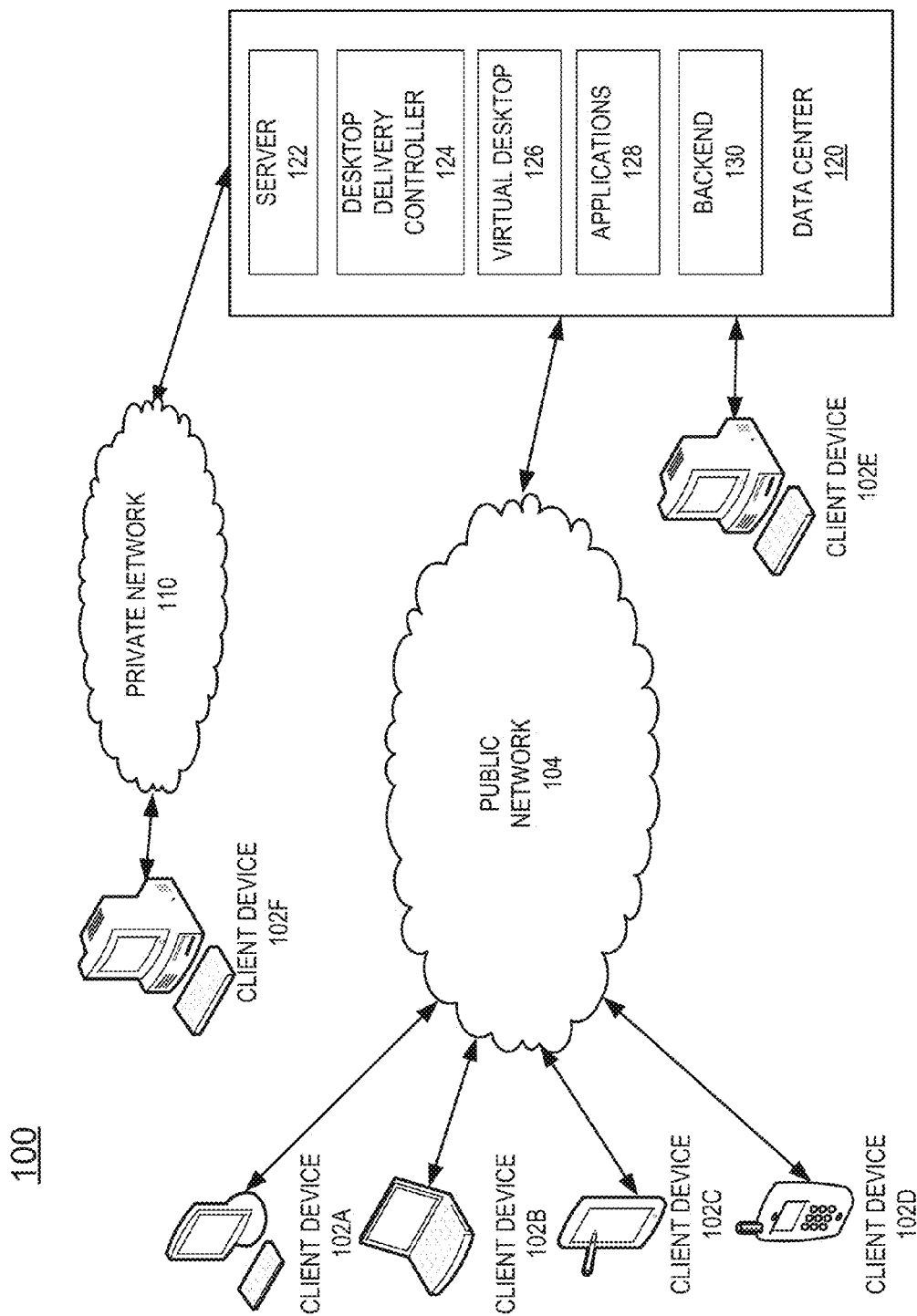
FIG. 1 illustrates an exemplary computing environment for implementing embodiments and features consistent with the present disclosure.

Reference will now be made in detail to the present embodiments of the disclosure, certain examples of which are illustrated in the accompanying drawings.

In this disclosure, the term "platform" may refer to any particular configuration of software and/or hardware on a computing device. For example, "platform" may refer to a computing device configuration utilizing a particular operating system or a version thereof, such as a Windows-based operating system (e.g., Windows 8), an Apple-based operating system (e.g., Mac OS X), or a mobile-based operating system (e.g., Apple iOS). "Platform" may also refer to a computing device configuration comprising a certain combination of applications. For example, a particular platform may comprise a configuration using Microsoft Office applications. "Platform" may further refer to a computing device configuration including a certain combination of files, registry settings, and/or configuration settings of a computing device. "Platform" may still further refer to a computing device configuration including a certain hardware configuration, such as a particular processor. "Platform" may also refer to any combination of the above. Thus, the term "platform," as used herein, may refer to any combination of software and/or hardware configurations on a computing device.

Embodiments of the present disclosure relate to computerized systems and methods for facilitating application analysis. Embodiments of the present disclosure may include systems and methods that allow an operator to select an application and a user from an operator interface. For example, an operator may manage a network with multiple users associated with different types and/or versions of devices implementing different computing platforms. The operator may wish to determine whether one or more applications are compatible with one or more of the computing platforms. In accordance with embodiments of the present disclosure, the operator may select one or more applications and one or more user identities, and the systems and methods may identify which computing platforms are implemented on devices associated with the selected user identities. The systems and methods may then determine whether applications are compatible with the identified computing platforms, and may display indications of whether the applications are compatible with the computing platforms in an operator interface.

Current conventional systems and methods for determining application compatibility suffer from multiple disadvantages. For example, conventional systems and methods typically require an administrator to make manual determinations of compatibility, after testing an application on a device having a certain configuration, requiring a significant amount of an organization's time and man-power. And while a number of current techniques exist for determining the compatibility of an application across different computing environments, these techniques require manual use of diagnostic tools such as process monitors and debuggers to look for defects in a process that depends on the skill and attention of a trained professional, because such a determination requires that the person in charge of the testing have specialized knowledge to conduct such tests.

Embodiments of the present disclosure can address the challenges associated with determining the compatibility of applications with various computing environments. For example, embodiments of the present disclosure provide computerized systems and methods that may allow an operator to select one or more applications and one or more user identities from an operator interface, and identify computing platforms implemented on devices of users identified by the user identities. The computerized systems and methods may further determine whether the selected applications are compatible with the computing platforms, and may display compatibility indicators in the operating interface to indicate which applications are compatible with which computing platforms.

The computer-implemented methods disclosed herein may be executed, for example, by one or more processors that receive instructions from one or more non-transitory computer-readable storage mediums. Similarly, systems consistent with the present disclosure may include at least one processor and memory, and the memory may be a non-transitory computer-readable medium.

As used herein, a non-transitory computer-readable storage medium refers to any type of physical memory on which information or data readable by a processor may be stored. Examples include random access memory (RAM), read-only memory (ROM), volatile memory, nonvolatile memory, hard drives, compact disc read-only memory (CD ROM), digital versatile disc (DVD) memory, flash drives, magnetic strip storage, semiconductor storage, optical disc storage, magneto-optical disc storage, and/or any other known physical storage medium. Singular terms, such as "memory" and "computer-readable storage medium," may additionally refer to multiple structures, such as a plurality of memories and/or computer-readable storage mediums.

Embodiments of the present disclosure relate to computerized systems and methods for facilitating application analysis. In addition, embodiments of the present disclosure relate to solutions for providing an operator, such as a network administrator, with information regarding whether a particular application is compatible with a computing platform of a device used by a user of the network.

In accordance with some embodiments of the present disclosure, computerized systems and methods are provided that allow an operator to select an application and a user from an operator interface. Once the application and user have been identified, the computerized systems and methods may identify a computing platform associated with a device of the user. Once the computing platform has been identified, the computerized systems and methods may determine whether the selected application is compatible with the computing platform, and may provide a compatibility indicator for display in the operator interface based on the determination.

In accordance with the present disclosure, there is provided a computer-implemented method for analyzing software compatibility. The method comprises steps performed by at least one processor. The steps include receiving an indication of a selection of an application from one or more applications in an operator interface, and receiving a selection of a user identity from a plurality of user identities presented in an operator interface. The steps also include identifying a computing platform implemented on a device associated with the selected user identity. The steps further include determining whether the selected application is compatible with the computing platform, and providing a compatibility indicator for display in the operator interface based on the determination.

Furthermore, in accordance with the present disclosure, there is provided a computer-implemented system for analyzing software compatibility. The system comprises a memory device that stores instructions, and one or more processors that execute the instructions. The one or more processors execute the instructions to receive selected selection of an application from one or more applications presented in an operator interface, and to receive a selection of a user identity from a listing of user identities in the operator interface. The one or more processors also execute the instructions to identify a computing platform implemented on a device associated with the selected user identity. The one or more processors further execute the instructions to determine whether the selected application is compatible with the computing platform, and to provide a compatibility indicator for display in the operator interface based on the determination.

Additionally, in accordance with the present disclosure, there is provided a non-transitory computer-readable medium that stores instructions. The instructions, when executed by one or more processors, cause the one or more processors to perform a method. The method comprises receiving selected selection of an application from one or more applications presented in an operator interface, and receiving selected selection of a user identity from a plurality of user identities presented in the operator interface. The method also comprises identifying a computing platform implemented on a device associated with the selected user identity. The method further comprises determining whether the selected application is compatible with the computing platform, and providing a compatibility indicator for display in the operator interface based on the determination. It is to be understood that the disclosure is not limited in its application to the details of constructions and to the arrangements set forth in the following description or illustrated in the drawings. The disclosure is capable of embodiments in addition to those described and is capable of being practiced and carried out in various ways. Also, it is to be understood that the phraseology and terminology employed herein, as well as in the abstract, are for the purposes of description and should not be regarded as limiting.

The accompanying drawings, which are incorporated and constitute part of the specification, illustrate certain embodiments of the disclosure, and together with the description, serve to explain the principles of the disclosure.

As such, those skilled in the art will appreciate that the conception upon which the disclosure is based may readily be utilized as a basis for designing other structures, methods, and/or systems for carrying out the several purposes of the present disclosure. It is important, therefore, to recognize that the claims should be regarded as including such equivalent constructions insofar as they do not depart from the spirit and scope of the present disclosure.

FIG. 1 is a block diagram of an exemplary computing environment 100 for implementing embodiments and features of the present disclosure. The arrangement and number of components in environment 100 is provided for purposes of illustration. Additional arrangements, number of components, and other modifications may be made, without departing from the spirit and scope of the present disclosure.

As shown in FIG. 1, computing environment 100 may include any combination of one or more client devices 102A-F, public network(s) 104, private network(s) 110, and data center(s) 120. While client devices 102A-F are depicted as a computer (e.g., client devices 102A, 102E, and 102F), a laptop (e.g., client device 102B), a tablet (e.g., client device 102C), and a mobile smart phone (e.g., client device 102D), the disclosure is not so limited. One or more of client devices 102A-F could be, for example, a mobile phone, smart phone, tablet, netbook, electronic reader, personal digital assistant (PDA), personal computer, laptop computer, wearable device (such as a smart watch), gaming device, desktop computer, set-top box, television, personal organizer, portable electronic device, smart appliance, navigation device, and/or other types of computing devices. In some embodiments, client device 102A-F may be implemented as hardware and/or software applications running thereon. A user may use one or more of client devices 102A-F to communicate with one or more other client devices 102A-F and/or data center(s) 120 over public network(s) 104 and/or private network(s) 110. Client devices 102A-F may transmit data to and/or receive data from other client device(s) 102A-F and/or data center(s) 120 over public network(s) 104 and/or private network(s) 110.

Although FIG. 1 illustrates six client devices, the disclosure is not so limited. Computing environment 100 may include any number of client devices, and/or any combination of types of client devices.

Computing environment 100 may also include one or more public networks 104 and/or private networks 110. Public network(s) 104 and/or private network(s) 110 may connect and exchange information among client device(s) 102A-F, among data center(s) 120, and/or between client device(s) 102A-F and data center(s) 120. Public network(s) 104 and/or private network(s) 110 may include one or more types of networks interconnecting client device(s) 102A-F and/or data center(s) 120. For example, one of client device 102A-F may communicate with a data center 120 using a different type of network than a second of client device 102A-F.

Public network(s) 104 and/or private network(s) 110 may be implemented using one or more networks, which may include one or more wide area networks (WANs), metropolitan area networks (MANs), local area networks (LANs), or personal area networks (PANs), or any combination of these networks. Public network(s) 104 and/or private network(s) 110 may include any one or more types of networks, including the Internet, intranet, Ethernet, twisted-pair, coaxial cable, fiber optic, cellular, satellite, IEEE 802.11, terrestrial, and/or other types of wired or wireless networks.

Computing environment 100 may further include one or more data centers 120. Data center 120 may be a central repository, either physical or virtual, for the storage, management, and/or dissemination of data and/or information pertaining to a particular public and/or private entity. Data center 120 may include one or more physical servers, virtual servers, storage systems, web servers, databases, mainframe computers, general-purpose computers, personal computers, or other types of computing devices. Data center 120 may include, among other things, one or more servers (e.g., server(s) 122), desktop delivery controller(s) 124, virtual desktop(s) 126, application(s) 128, and backend system(s) 130. In some embodiments, data center 120 may be configured to store information, retrieve information, receive information, and/or provide information. Data center 120 may be a standalone computer system or apparatus, or may include and/or be part of a larger system. For example, data center 120 may represent one or more computing components, such as server(s) 122, that may communicate with one another over a communications network, or over a dedicated network, such as a LAN. Data center 120 may include one or more backend systems 130 for carrying out one or more aspects of the present disclosure.

Data center 120 may be implemented as a system comprising a plurality of servers, or a server farm comprising a load balancing system and a plurality of servers. In some embodiments, data center 120 may include one or more servers 122 with hardware devices and/or software applications running thereon. Data center(s) 120 may communicate with client device(s) 102A-F over public network(s) 104 and/or private network(s) 110. One or more of client devices 102A-F may acquire remote services from data center(s) 120 through various means. For example, client devices 102A-F may communicate with data center 120 either directly (e.g., client device 102E) or indirectly through public network(s) 104 (e.g., client devices 102A-D) and/or a private network(s) 110 (e.g., client device 102F).

Server 122 may be an entity represented by an Internet Protocol (IP) address, and may exist as a single entity or as a member of a server farm. Server 122 may be a physical server or a virtual server. In some embodiments, server 122 may include one or more hardware layers, operating systems, and/or hypervisors creating and/or managing one or more virtual machines. Server 122 may provide one or more services to an endpoint, such as client devices 102A-F. These services may include providing one or more desktops operating on one or more platforms and/or one or more applications 128 to one or more endpoints (e.g., client devices 102A-F). For example, application(s) 128 may include application(s) and/or resource(s) based on a Windows or SAP system. In some embodiments, server(s) 122 may provide application compatibility services. For example, server(s) 122 may determine the compatibility of an application with one or more platforms (e.g., Windows 7 and/or Windows 8).

Desktop delivery controller(s) 124 may enable delivery of services, such as virtual desktops 126 to client devices (e.g., client devices 102A-F). Desktop delivery controller(s) 124 may be implemented in software and/or hardware within a computer system, such as computer system 200 of FIG. 2. Desktop delivery controller(s) 124 may provide functionality to manage, maintain, and/or optimize the provisioning of application(s) 128. In some embodiments, controlling, managing, maintaining, and/or optimizing the provisioning of application(s) 128 may be implemented for one or more platforms. That is, desktop delivery controller(s) 124 may enable delivery of application compatibility services for one or more platforms.

In some embodiments, one or more virtual desktops 126 may provide one or more application(s) 128. Virtual desktops 126 may include hosted shared desktops allowing users to access a single shared remote-desktop-services desktop, virtual desktop infrastructure desktops allowing users to have their own virtual machines, streaming disk images, a local virtual machine, individual applications (e.g., one or more of applications 128), or a combination thereof. In some embodiments, application(s) 128 may be associated with one or more platforms. That is, one or more virtual desktops 126 may provide one or more application(s) 128 that may be used to verify application compatibility with a platform.

Backend system(s) 130 may include a single or multiple instances of computer networking hardware, appliances, and/or servers in a server farm or a group of servers. Backend system(s) 130 may interface directly or indirectly with server(s) 122. For example, backend system(s) 130 may include Microsoft Active Directory, which may provide a number of network services, including one or more of lightweight directory access protocol (LDAP) directory services, Kerberos-based authentication, domain name system (DNS) based naming and other network information, and/or synchronization of directory updates amongst server(s) 122. Backend system(s) 130 may also include, among other things one or more Oracle backend server(s), structured query language (SQL) server backends, and/or dynamic host configuration protocol (DHCP) server backends. Backend system(s) 130 may provide data, services, or a combination of both to data center(s) 120, which may then provide that information via one or more forms to client device(s) 102A-F and/or branch office(s) (not shown).

Figure 2A:
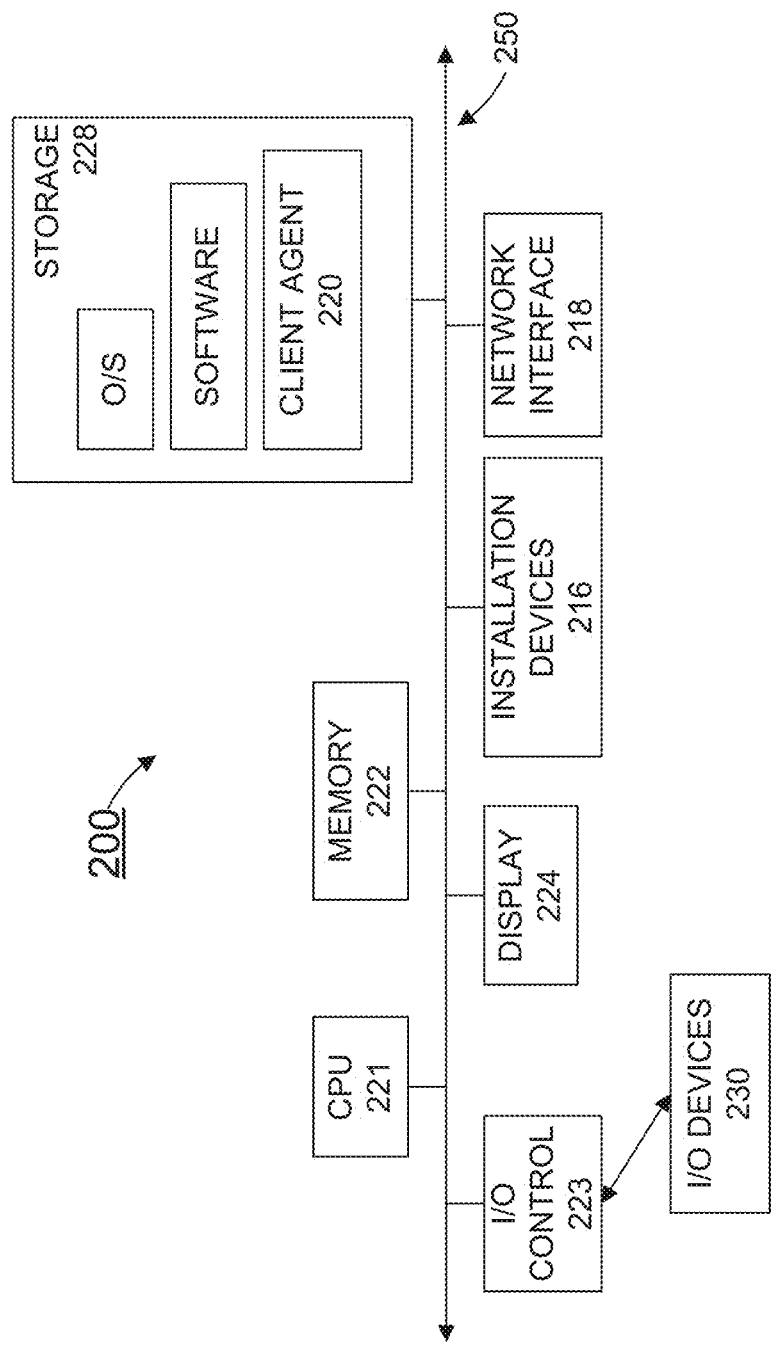
FIGS. 2A-2B illustrate an exemplary computer system for implementing embodiments and features consistent with the present disclosure.
Figure 2B:
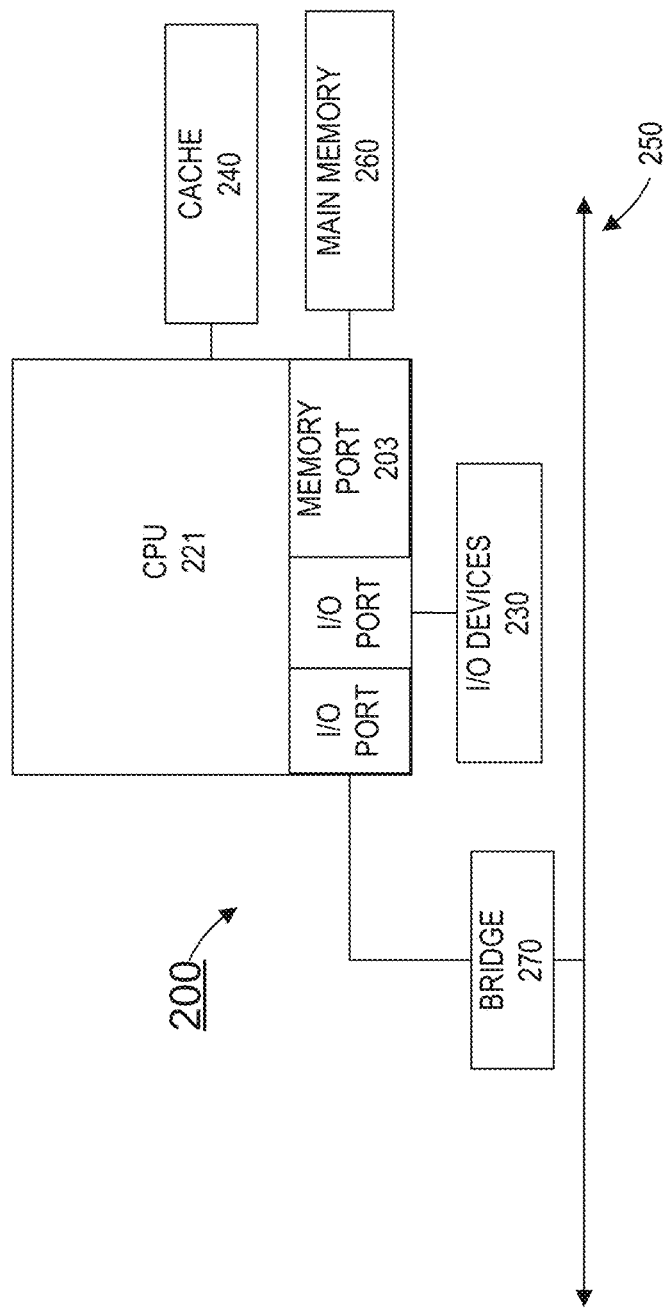

FIGS. 2A-2B are block diagrams illustrating an exemplary computer system 200 that may be used for implementing embodiments consistent with the present disclosure, including the exemplary systems and methods described herein. Computer system 200 can be provided at the backend system 130 and can be used to implement server(s) 122, backend system(s) 130, desktop delivery controller(s) 124, and/or client device(s) 102A-F. The arrangement and number of components in computer system 200 is provided for purposes of illustration. Additional arrangements, number of components, or other modifications may be made, consistent with the present disclosure.

As shown in FIGS. 2A-2B, a computer system 200 may include one or more central processing units (CPUs) 221 for executing instructions. CPUs suitable for the execution of instructions include, by way of example, both general and special purpose CPUs, and any one or more processors of any kind of digital computer. CPU(s) 221 may include any logic circuitry that responds to and processes instructions received from one or more main memories 260, memories 222, and/or storage devices 228. CPU(s) 221 may include a single or multiple microprocessors, field-programmable gate arrays (FPGAs), or digital signal processors (DSPs) capable of executing particular sets of instructions stored in one or more main memories 260, memories 222, storage devices 228, or caches (e.g., cache(s) 240).

A computer system 200 may include one or more main memories 260, memories 222, storage devices 228, and/or caches 240, configured to store data and/or software instructions used by CPU(s) 221 to perform operations consistent with disclosed embodiments. For example, computing system 200 may include one or more main memories 260 configured to store one or more software programs that, when executed by CPU(s) 221, cause CPU(s) 221 to perform functions and/or operations consistent with disclosed embodiments. By way of example, a main memory 260 may include NOR or NAND flash memory devices, read only memory (ROM) devices, random access memory (RAM) devices, etc. A main memory 260 may include one or more memory chips capable of storing data and/or allowing storage locations to be directly accessed by CPU(s) 221. In one exemplary embodiment, CPU(s) 221 may communicate with one or more main memories 260 via a system bus 250. A computer system 200 may include any number of main memories 260.

A computer system 200 may also include memories 222 and/or storage devices 228. By way of example, memories 222 and/or storage devices 228 may include one or more tangible and/or non-transitory computer-readable mediums, such as flexible disks, hard disks, read-only memories (ROMs), random access memories (RAMs), compact disk read-only memories (CD-ROMs), magneto-optical (MO) drives, digital versatile disk read-only memories (DVD-ROMs), digital versatile disk random-access memories (DVD-RAMs), semiconductor memories, tape drives, redundant array of independent disks (RAID arrays), flash drives, flash memories, registers, and caches etc. Memories 222 and/or storage devices 228 may be located remotely and computer system 200 may be able to access other memories 222 and/or storage devices 228 via a network, such as private network(s) 110 and/or public network(s) 104. One or more memories 222 and/or storage devices 228 may be configured to store data, and may store data received from one or more of server(s) 122, backend server(s) 130, and client device(s) 102A-F. One or more memories 222 and/or storage devices 228 may also store one or more operating systems, application software programs, and/or other software.

A computer system 200 may also include one or more displays 224 for displaying data and information. Display(s) 224 may be implemented using one or more display panels, which may include, for example, one or more cathode ray tube (CRT) displays, liquid crystal displays (LCDs), plasma displays, light emitting diode (LED) displays, touch screen type displays, projector displays (e.g., images projected on a screen or surface, holographic images, etc.), organic light emitting diode (OLED) displays, field emission displays (FEDs), active matrix displays, vacuum fluorescent (VFR) displays, 3-dimensional (3-D) displays, electronic paper (e-ink) displays, microdisplays, or any combination of the above types of displays.

A computer system 200 may further one or more input/output (I/O) devices 230 connected through an I/O controller 223, both of which may communicate via system bus 250. I/O devices 230 may include, for example, one or more keys, buttons, keyboards, mice, joysticks, styluses, gesture sensors (e.g., video cameras), and/or voice sensors (e.g., microphones). Keys, keyboards, and/or buttons may be physical and/or virtual (e.g., provided on a touch screen interface).

A computer system 200 may support one or more installation devices 216, such as floppy disk drives for receiving floppy disks (e.g., 3.5-inch, 5.25-inch, or Zip disks), CD-ROM drives, CD-R/RW (readable/rewritable compact disc) drives, DVD-ROM drives, tape drives, universal serial bus (USB) devices, hard-drives, or any other device suitable for installing software and programs, such as client agent 220, or portion thereof. Installation device(s) 216 could also be used as storage device(s) 228.

A computer system 200 may further include one or more network interfaces 218 for interfacing to a network, such as a PAN, LAN, MAN, WAN, and/or the Internet through a variety of connections including, but not limited to, standard telephone lines, LAN or WAN links (e.g., 802.11, T1, T3, 56 kb, X.25), broadband connections (e.g., integrated services digital network (ISDN), Frame Relay, asynchronous transfer mode (ATM)), wireless connections, or some combination of any or all of the above. Network interface(s) 218 may comprise a built-in network adapter, network interface card, personal computer memory card international association (PCMCIA) network card, card bus network adapter, wireless network adapter, USB network adapter, modem, and/or any other device suitable for interfacing computer system 200 to any type of network.

As illustrated in FIG. 2B, CPU(s) 221 of a computer system 200 may communicate directly with one or more main memories 222 via one or more memory ports 203. CPU(s) 221 may also communicate with cache(s) 240 via one or more secondary busses, sometimes referred to as backside busses. In some other embodiments, CPU(s) 221 may communicate with cache(s) 240 via system bus(ses) 250. A cache 240 may have a faster response time than a main memory 260. In some embodiments, such as in the embodiments illustrated in FIG. 2B, CPU(s) 221 may communicate directly with I/O device(s) 230 via one or more I/O ports. In further embodiments, I/O device(s) 230 may include one or more bridges 270 between system bus(ses) 250 and one or more external communication busses, such as USB busses, Apple Desktop Busses, RS-232 serial connections, small computer system interface (SCSI) busses, FireWire busses, Ethernet busses, ATM busses, high performance parallel interface (HIPPI) busses, Super HIPPI busses, SerialPlus busses, SCI/LAMP busses, FibreChannel busses, and/or Serial Attached small computer system interface busses.

Figure 3A:
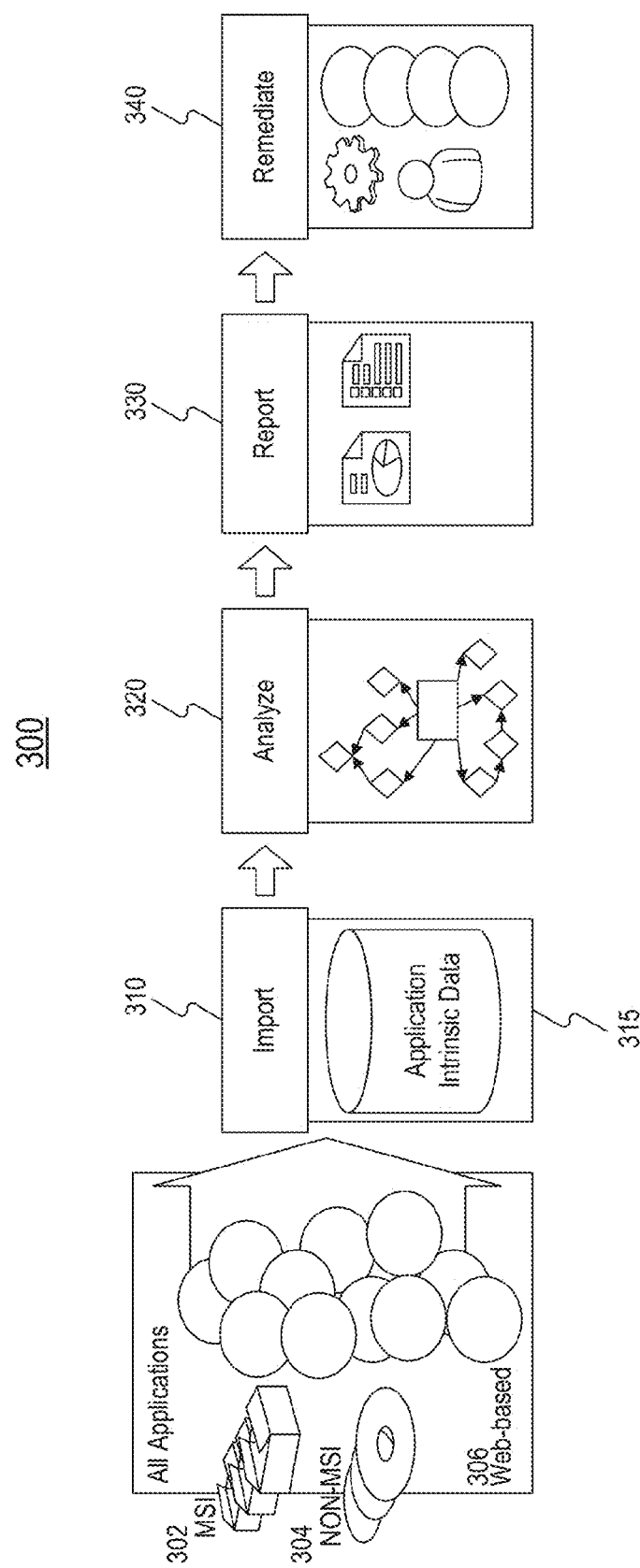
FIG. 3A is a block diagram of an exemplary process implementing an application compatibility system, consistent with embodiments of the present disclosure.

FIG. 3A depicts a block diagram of an exemplary process 300 for implementing an application compatibility system, consistent with embodiments of the present disclosure. Exemplary process 300 may include one or more steps comprising importing applications 310, analyzing the imported applications 320, generating reports 330, and remediating 340. Applications can be the raw material for the application compatibility system. When applications are imported, the application compatibility system can interrogate each application's files, registry entries, and application programming interface ("API") usage to expose data points associated with the application. Hereinafter, the data points of an application may be referred to as an application's intrinsic data.

Figure 3B:
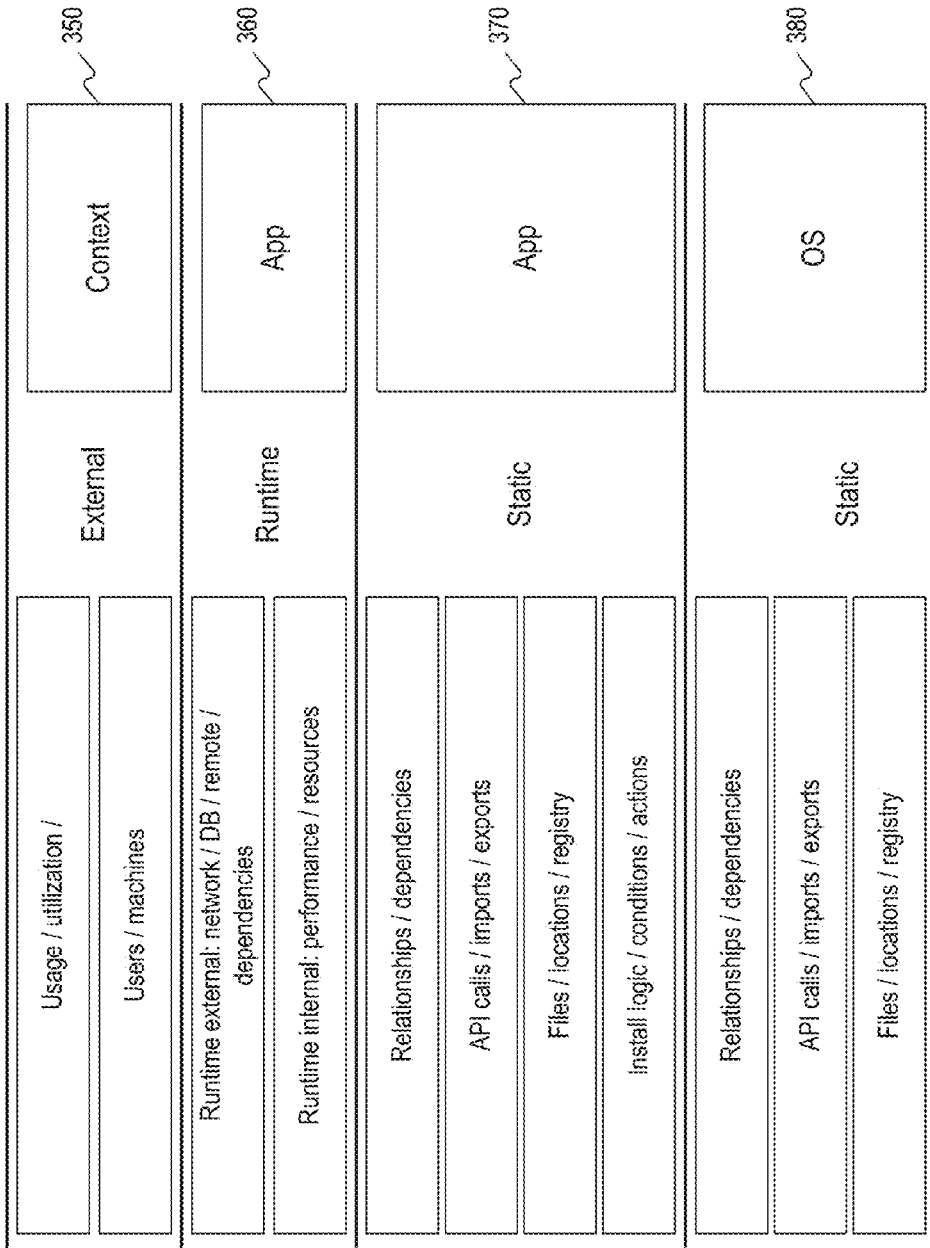
FIG. 3B is a block diagram block diagram illustrating exemplary application heuristic data points, consistent with embodiments of the present disclosure.

Each application can include a plurality of data points, which can be referred to as the application's intrinsic data. In some embodiments, the data points of an application can be determined based on heuristics. An example of the data points associated with an example application is illustrated in FIG. 3B. As shown in FIG. 3B, these data points can include information associated with an application static data 370 and also runtime data 360. Application static data 370 can include, for example, at least one of information associated with install logic, install conditions, install actions, application's files, registry settings, or configuration settings. Application static data 370 may further include information associated with API calls, API imports, and/or API exports. Additionally, static data can include information associated with relationships and/or dependencies within an application. Runtime data 360 can include, for example, runtime internal data regarding performance and resources, or runtime external data regarding dependencies between network, database, etc. These data points can also include an operating system static data 380. For example, operating system static data 380 can include information associated with operating system's files, registry settings, and/or configuration settings, as well as information associated operating system's API calls, API imports, and/or API exports. Additionally, operating system static data 380 can also include information associated with relationships and/or dependencies of an operating system. These data points can also include information associated with external context 350. For example, external context 350 can include information associated with users and/or devices associated with the users. External context 350 can also include information associated with usage and/or utilization of application compatibility system resources.

Figure 4:
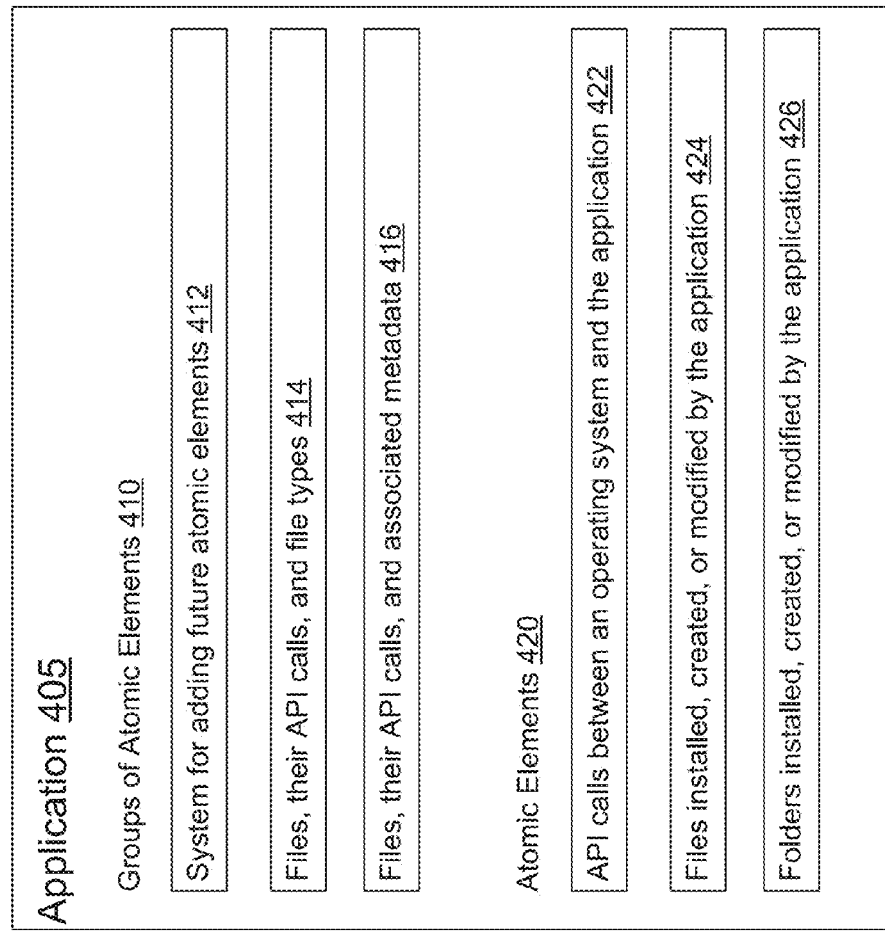
FIG. 4 is a block diagram illustrating an exemplary application compatibility system, consistent with embodiments of the present disclosure.

In some exemplary embodiments, an application's intrinsic data can be organized into elements, which can be referred to as atomic elements. An example of these atomic elements is illustrated in FIG. 4. As shown in FIG. 4, in some embodiments, atomic elements of an application can comprise at least one of the following: API calls between an operating system and the application 422; files that are either installed, created, or modified by the application 424; or folders that are either installed, created, or modified by the application 426. Although not shown in FIG. 4, atomic elements of an application can also comprise at least one of the following: registry keys that are either installed, created, or modified by the application; registry values that are either installed, created, or modified by the application; API calls between the application and another application; meta data information associated with the files of an application; or information associated with a system for adding new atomic elements. It will be understood that the above-listed atomic elements are merely exemplary and application's intrinsic data can be organized into any number of atomic elements. For example, an application can comprise intrinsic data including over 68,000 data points.

In some embodiments, an application's intrinsic data can be organized into groups of atomic elements. An example of these groups of atomic elements is illustrated in FIG. 4. In some embodiments, two or more atomic elements can be combined to form a group of atomic elements. For example, as shown in FIG. 4, a group of atomic elements can comprise API calls associated with a plurality of files. Such an exemplary group of atomic elements can comprise a combination of API calls between a first file and a second file of the plurality of files, and API calls between one file of the plurality of files and an operating system. In some embodiments, groups of atomic elements can comprise information associated with a system for adding new atomic elements 412; or files types associated with one or more files 414; or meta data associated with one or more files 416. It will be understood that the above-listed group of atomic elements are merely exemplary and application's intrinsic data can be organized into any number of groups of atomic elements.

In some embodiments, an application's intrinsic data can be organized into containers and sub-containers (not shown in FIG. 4). In some embodiments, a container may comprise a group of atomic elements. For example, an exemplary group of atomic elements, as depicted in FIG. 4, can comprise a combination of API calls between a first file and a second file of the plurality of files, and API calls between one file of the plurality of files and an operating system. In some embodiments, containers can be used for a bulk-level compatibility verification, which can potentially generate a signature for the whole container or group of atomic elements. This signature can be used to rapidly match against, for example, intrinsic data that is known to be good ("known good intrinsic data") or intrinsic data that is known to be bad ("known bad intrinsic data") across a larger sample (e.g., a container at a time) in one comparison that can improve efficiency of the compatibility verification process, as opposed to atomic-level verification, where the compatibility verification proceeds one atomic element at a time. A status of known good intrinsic data can signify that all atomic elements associated with an application are known to be compatible with a target platform. A status of known bad intrinsic data can signify that at least one atomic element associated with an application is known to be not compatible with a target platform. It will be understood that the exemplary bulk-level verification can also be performed with other statuses of atomic elements, such as intrinsic data that is suspect ("known suspect intrinsic data"), which is discussed below.

In some embodiments, containers may comprise a collection of files residing in a folder, and a sub-container could be a sub-folder residing in the folder. In some embodiments, a similar parallel can exist for registry hives, and keys, and their sub-keys. The installation package, for example, and Runtime redistributable like the Microsoft Visual C++ Runtime, can form one of these meta groups or atomic elements. It will be understood that the above-listed definitions of containers and sub-containers are not limiting and are merely exemplary.

Referring back to FIG. 3A, applications imported in importing step 310 can comprise any kind of application including, but not limited to, desktop applications (e.g., MSI applications 302, non-MSI applications 304), or web based applications (for example, web applications 306). MSI applications 302 can include, for example, Microsoft Installer or Windows Installer based applications. That is, MSI applications 302 can be applications that use a .msi file (Microsoft Installer or Windows Installer) in the process of installation. Non-MSI applications 304 can be applications that use an interface other than Microsoft Installer or Windows Installer interface for installation, such as Microsoft App-V or a custom developed setup.exe file.

Importing step 310 can be implemented differently between importing desktop applications and web applications. For example, Windows desktop applications can be imported using the applications' installation packages. These installation packages can include an .msi file or any other type of installation package used in the industry. In some embodiments, such installation packages can be App-V (e.g., .sft or .appv) packages. Web applications can be imported into the application compatibility system by using one of the two different exemplary approaches described below, or a combination of those approaches. In some embodiments, web applications can be imported by a directed web spider or web crawler to crawl over the run-time HTML pages and capture them for import into the application compatibility system. In some embodiments, importing can be accomplished by importing the web applications' source files into a database of application compatibility system.

Figure 5:
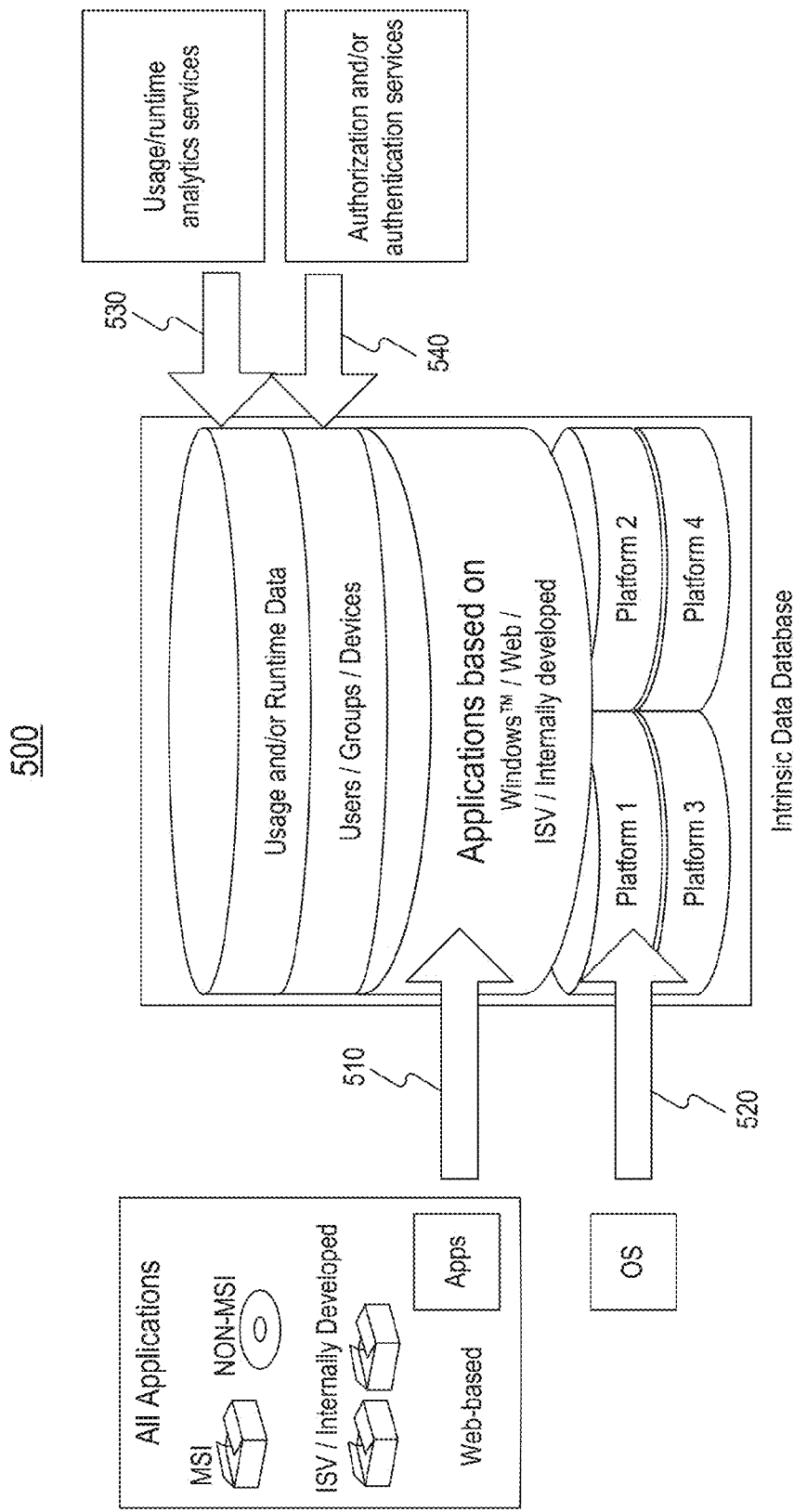
FIG. 5 is a block diagram illustrating an exemplary database of an application compatibility system, consistent with embodiments of the present disclosure.

FIG. 5 depicts an exemplary database, intrinsic data database 500, of an application compatibility system. In accordance with some embodiments, intrinsic data database 500 can be a structured collection of tables, lists, or other data for design verification setup and runtime execution. In some embodiments, the structure may be organized as a relational database or an object-oriented database. In some embodiments, intrinsic data database 500 can be a hardware system comprising physical computer readable storage media and input and/or output devices configured to receive and provide access to tables, lists, or other data structures. Furthermore, configured as a hardware system, intrinsic data database 500 can include one or more processors and/or displays.

In some embodiments, intrinsic data database 500 can reside within a server (e.g., server 122) hosting the application compatibility system. In some embodiments, intrinsic data database 500 can reside on a server (or on a distributed network of servers) remote from a server hosting the application compatibility system. Applications imported in importing step 510 of the application compatibility system can reside in intrinsic data database 500. Each such application can be associated with one or more compatibility algorithms, which can also reside in intrinsic data database 500. In some embodiments, compatibility algorithms are created by a user of the application compatibility system, whereas in some embodiments, such algorithms can already be created and saved in a universal algorithm library residing in intrinsic data database 500.

Intrinsic data database 500 can also include information associated with operating systems (e.g., operating system intrinsic data) 520, running on computing device 200. For example, operating systems running on computing device can include Windows 7, Windows Server 2003, Windows XP, and Windows Server 2008 R2. In some embodiments, information associated with operating systems (e.g., operating system image or snapshot) can be uploaded by a user of the application compatibility system, whereas in some embodiments such information can be extracted by an application compatibility system itself. For example, operating system intrinsic data can include information describing a certificate chain on an operating system image. Using the signing certificate authority on the certificate chain, an algorithm can simply process the certificate chain until it identifies the certificate as either trusted or untrusted. It will be understood that the application compatibility system can also allow users to load multiple operating system images concurrently to enable the user to execute algorithms for compatibility with all such platforms in a single pass. Intrinsic data database 500 can further include information associated with usage and/or runtime data 530. Intrinsic data database 500 can further include information associated with auditing, performance, users, groups, and/or devices 540, as depicted in FIG. 5.

Figure 6:
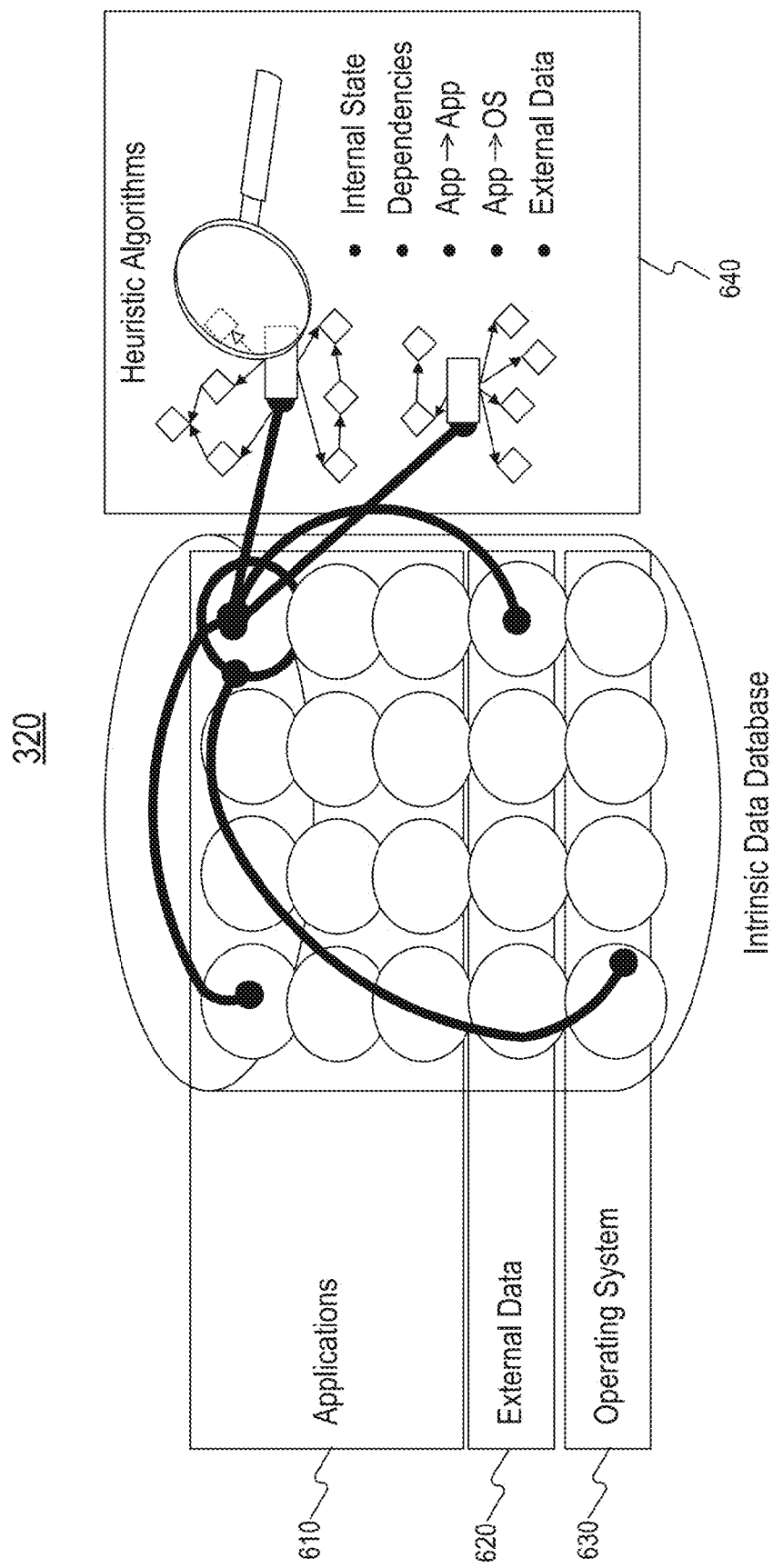
FIG. 6 is a block diagram illustrating an exemplary embodiment of an application compatibility system performing an analysis of an application, consistent with embodiments of the present disclosure.

FIG. 6 depicts an exemplary analysis step 320 of an application compatibility system. After the applications are imported into the application compatibility system, those applications can be analyzed to check for compatibility with one or more platforms. An exemplary analysis process can include analyzing an application's intrinsic data comprising information associated with an application's install logic, files, registry settings, configuration settings, or API calls. In some embodiments, an analysis process can also include analyzing one or more of an operating system image data 630, external data 620, journal entries (not shown), or configuration manager data (not shown) associated with runtime environment. A typical analysis process involves analyzing imported applications 610 just once. There may be embodiments, however, where imported applications 610 are re-analyzed, for example, in response to changes in any attributes of the one or more platforms including an operating system of the one or more platforms. Furthermore, if there are any changes to any of the other attributes of the one or more platforms, imported applications 610 can also be re-analyzed. In some embodiments, analysis step 320 can comprise analyzing an application's intrinsic data comprising atomic elements and/or groups of atomic elements.

In some embodiments, an application compatibility status can be determined by verifying a digital signature associated with the application. A digital signature associated with an application can be a generic pattern or a specific pattern. For example, an application's digital signature can be a hash value returned by a hash function. It is well understood that a hash function can be any algorithm that maps data of variable length to data of a fixed length. The values returned by a hash function can be called hash values, hash codes, hash sums, checksums, or simply hashes. In some embodiments where an application's digital signature is defined as a pre-defined hash value of a specific string of data (e.g., meta data associated with the application), an application compatibility system can determine the application's compatibility with a given platform by comparing the application's hash value for the given platform with that of the pre-defined hash value. If the comparison results in a match between the application's hash value for the given platform and the pre-defined hash value, the application compatibility system can identify the application as being compatible with the given platform. If, on the other hand, the comparison does not result in a match between the application's hash value for the given platform and the pre-defined hash value, the application compatibility system can identify the application as being not compatible with the given platform. It will be understood that an application's digital signature can be defined in many ways other than and different from the exemplary hash function described above.

Imported applications can be associated with compatibility algorithms that can be used in the analysis process. In some embodiments, each imported application can be associated with one or more compatibility algorithms. In some embodiments, compatibility algorithms can be implemented as heuristic algorithms 640. In some embodiments, compatibility algorithms can relate to information associated with the one or more platforms including internal states, dependencies, relationships between one application and another, relationships between an application and an operating system, or external data. Compatibility algorithms can also relate to operating system image-dependent algorithms, including dependencies on features that are provided by an operating system. When relevant, these algorithms can interrogate the operating system image data that has been loaded into the database (e.g., intrinsic data database 500) of the application compatibility system. These algorithms can check a variety of operating system image information 630, including: APIs, registry information, file management system for each fixed drive partition, the certificate store, or some compatibility settings.

The application compatibility system can generate reports (e.g., report step 330), as an output of analysis step 320. For example, such reports can contain information about a compatibility status of one or more applications that have been analyzed by the application compatibility system to determine whether the one or more applications are compatible to a corresponding platform. In some embodiments, reports can include icons to indicate the compatibility status of an application. For example, different icons can signify different statuses for an application. For example, one icon may indicate that an application will or is likely to work on a target platform. Another icon may indicate either that an application may fail or may have impaired functionality or that whether the application will work is unknown, although remediation is possible. Still another icon, on the other hand, may indicate that the application is likely to or certain to fail and that the application may need redevelopment.

It will be understood that any kind of status icons can be used to indicate a compatibility status of applications. It will further be understood that a definition of each status icon can be customizable and modified by a user of the application compatibility system.

The application compatibility system can provide information about any compatibility issues that have been detected in applications. For example, for applications that are associated with an icon indicating that the application may fail or have impaired functionality, remediation may be possible. In the application compatibility system, the term "remediation" may mean a process of resolving compatibility issues by making changes to applications or the environment so that those applications can work on the target platform. The application compatibility system can provide remediation report views, which provide information about the steps that can be taken to fix compatibility issues that have been detected, where possible. In some embodiments, more than one alternative approach can be provided. The remediation report can also provide details of the application components that are affected by each compatibility issue.

Figure 7:
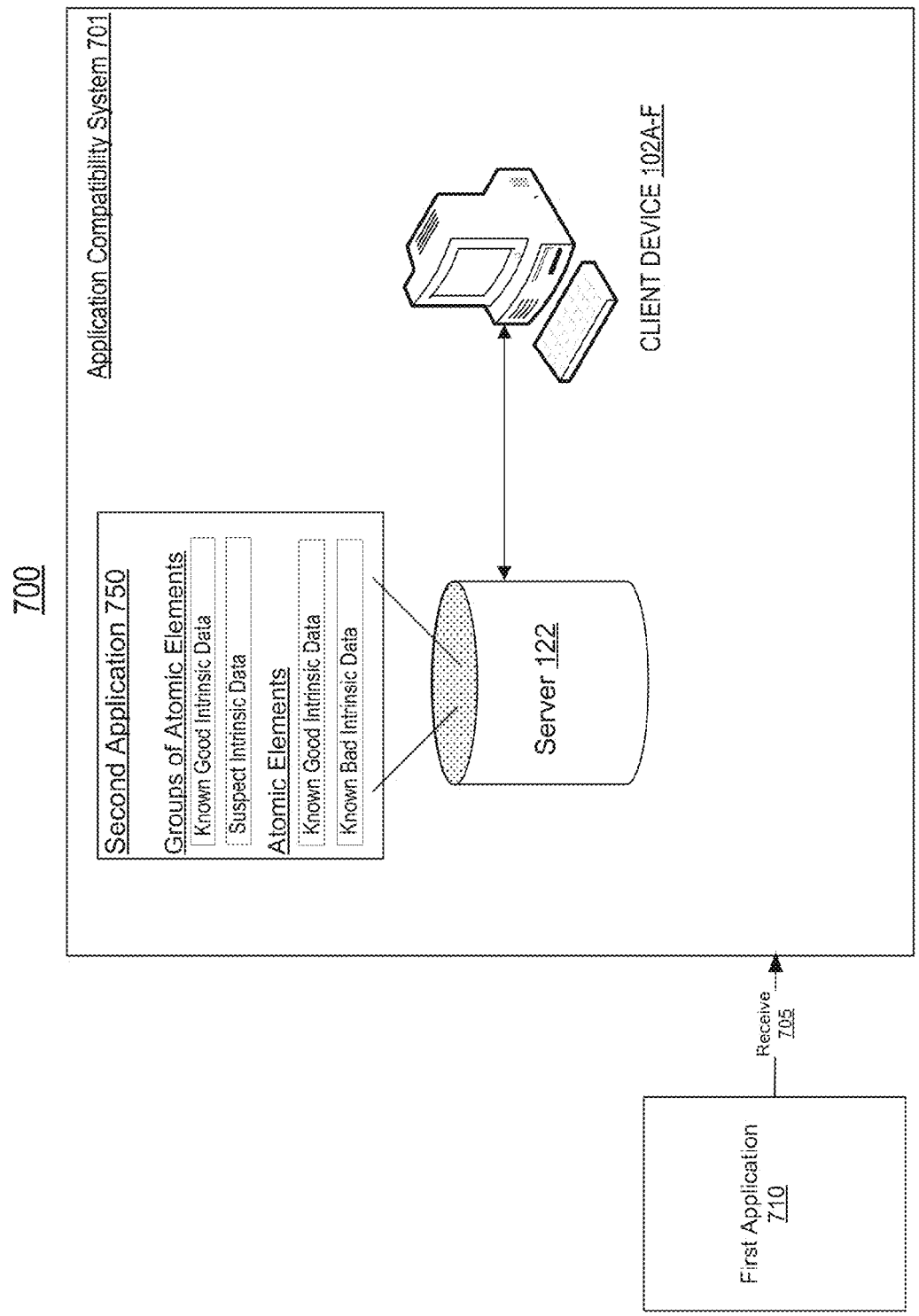
FIG. 7 is a block diagram illustrating an exemplary embodiment of an application compatibility system receiving a compatibility status request of an application for a given platform, consistent with embodiments of the present disclosure.
Figure 8:
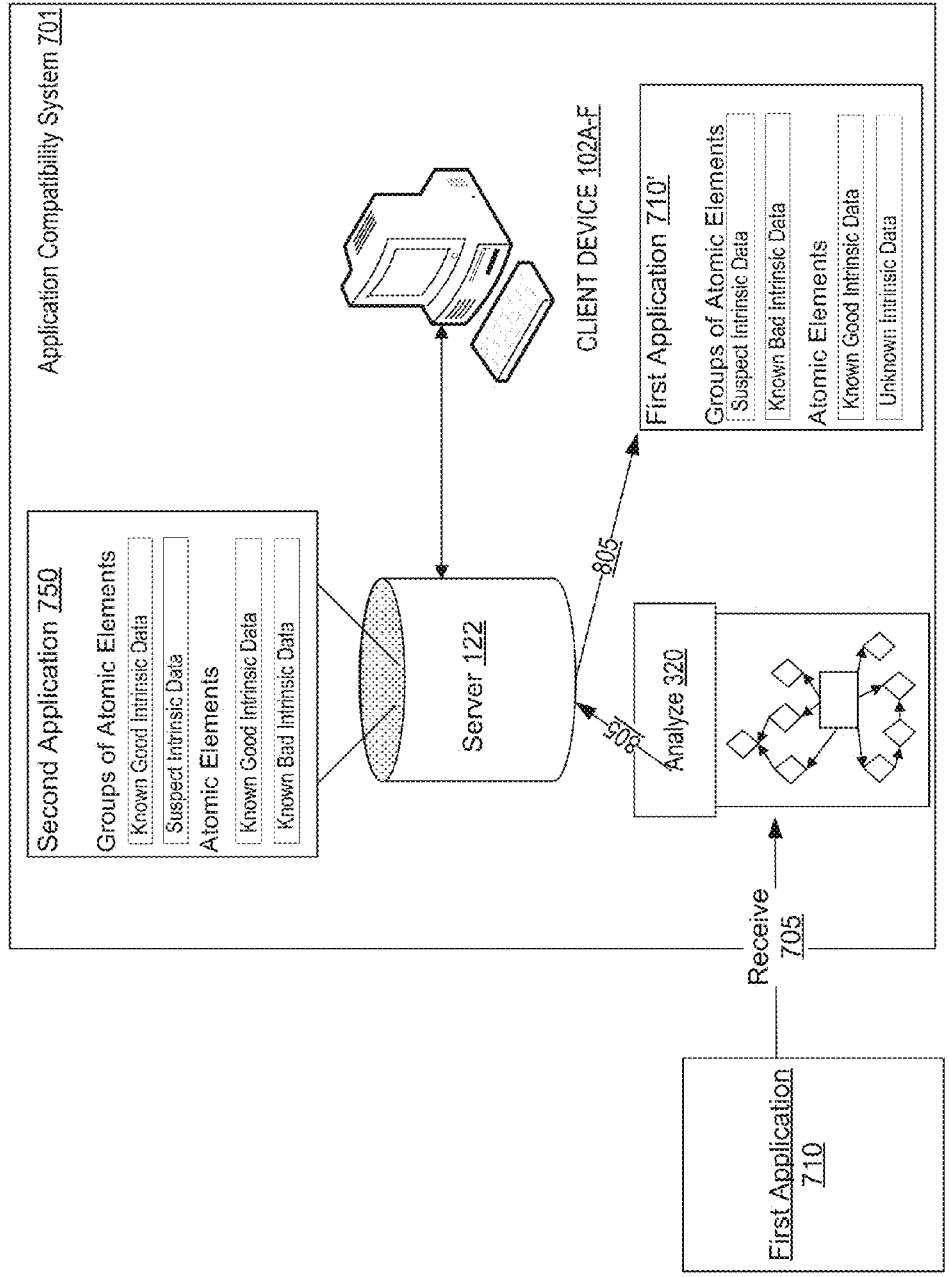
FIG. 8 is a block diagram illustrating an exemplary embodiments of an application compatibility system organizing data points associated with an application, consistent with embodiments of the present disclosure.
Figure 9:
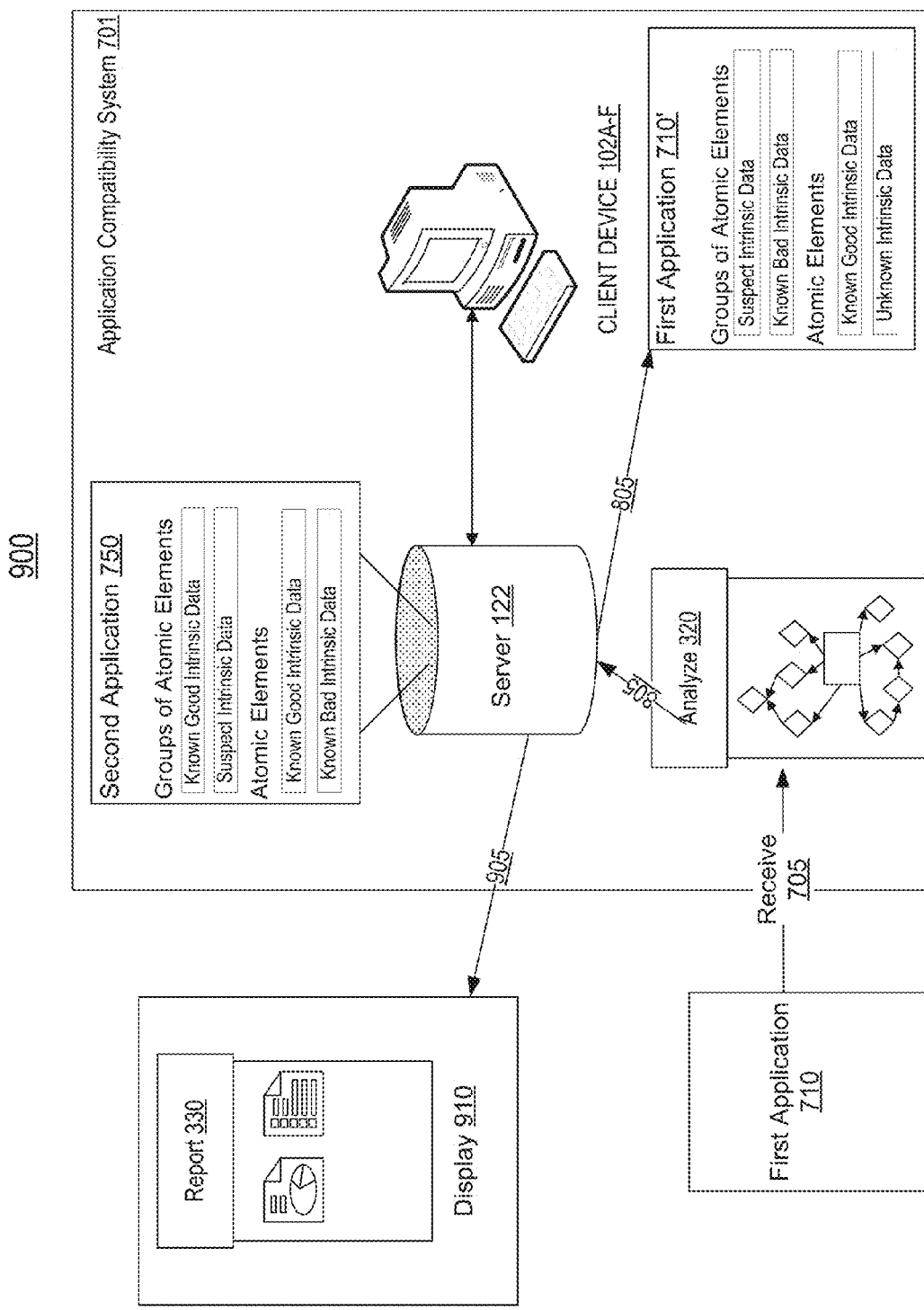
FIG. 9 is a block diagram illustrating an exemplary embodiment of an application compatibility system displaying a compatibility status of an application for a given platform, consistent with embodiments of the present disclosure.
Figure 10:
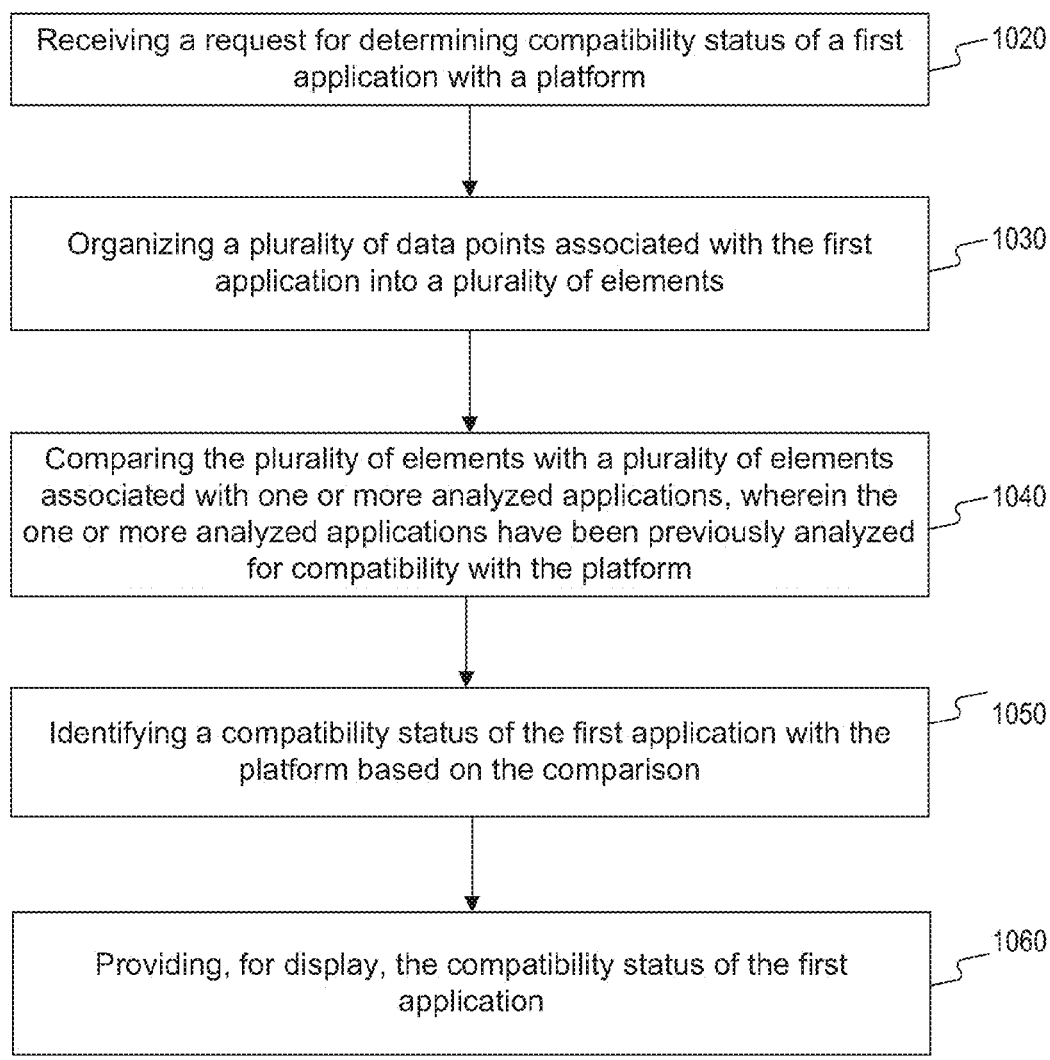
FIG. 10 is a flowchart illustrating an exemplary method for discovering an application compatibility status for a given platform, consistent with embodiments of the present disclosure.

FIGS. 7-9 depict block diagrams illustrating how application compatibility system 701 can determine compatibility of an application for a given platform, consistent with embodiments of the present disclosure. These steps are also illustrated as a flow chart in FIG. 10, which illustrates an exemplary method 1000 for determining whether an application is compatible with a given platform, consistent with embodiments of the present disclosure. Referring to FIG. 10, it will be appreciated that method 1000 may be altered to change the order of the steps, delete steps, or further include additional steps.

FIG. 7 depicts an application compatibility system 701 receiving, at step 705, a request for determining a compatibility status of a first application with a given platform. An exemplary receiving step is shown in a receiving block 1020 of method 1000 in FIG. 10. In some embodiments, the request (step 705) may be received at application compatibility system 701. Application compatibility system 701 may be the same as, or similar to, an application compatibility system as described with reference to FIG. 3. For simplicity, a block diagram of application compatibility system 701 is depicted with only one server 122 hosting the application compatibility system and one client device 102A-F. Step 705 can be associated with first application 710. First application 710 can either be an MSI application, a non-MSI application, or a web application. In some embodiments, first application 710 can be a new application being installed for the first time. In some embodiments, first application 710 can be an existing application that is currently residing at application compatibility system 701. In some embodiments, first application 710 can be a newer version of an existing application that is currently residing at application compatibility system 701.

Server 122 can host a database (e.g., intrinsic data database 500), where a plurality of applications can reside. In some embodiments, the plurality of applications residing at server 122 can be organized into atomic elements of the applications. For example, atomic elements of an application can comprise at least one of the following: API calls between an operating system to the application; files that are either installed, created, or modified by the application; or folders that are either installed, created, or modified by the application. Atomic elements can also comprise at least one of the following: registry keys that are either installed, created, or modified by the application; registry values that are either installed, created, or modified by the application; API calls between the application and another application; meta data information associated with the files of the application; or information associated with a system for adding new atomic elements.

In some embodiments, the plurality of applications residing at server 122 can also be organized into groups of atomic elements. For example, a group of atomic elements can comprise API calls associated with a plurality of files. Such an exemplary group of atomic elements can comprise a combination of API calls between a first file and a second file of the plurality of files, and API calls between one files of the plurality of files and an operating system. In some embodiments, groups of atomic elements can comprise information associated with a system for adding new atomic elements; or files types associated with one or more files; or meta data associated with one or more files. It will be understood that the above-listed group of atomic elements are merely exemplary and an application's intrinsic data can be organized into any number of groups of atomic elements. In some embodiments, the plurality of applications residing at server 122 can also be organized into atomic elements and groups of atomic elements.

In some embodiments, the plurality of applications residing at server 122 can also be organized into a plurality of containers and/or a plurality of sub-containers. In some embodiments, a container can be a group of atomic elements and can be defined to comprise a collection of files residing in a folder, and a sub-container could be a sub-folder residing in the folder. In some embodiments, a container and/or a sub-container can comprise API calls associated with a plurality of files. Such an exemplary container and/or an exemplary sub-container can comprise a combination of API calls between a first file and a second file of the plurality of files, and API calls between one files of the plurality of files and an operating system. In some embodiments, an exemplary container and/or or an exemplary sub-container can comprise information associated with a system for adding new atomic elements; or files types associated with one or more files; or meta data associated with one or more files. It will be understood that the above-listed containers and/or sub-containers are merely exemplary and atomic elements can be organized into any number of containers and/or sub-containers.

FIG. 7 illustrates an exemplary second application 750 residing within server 122. In some embodiments, second application 750 can be organized into atomic elements and/or groups of atomic elements. In some embodiments, second application 750 can be organized into containers and/or sub-containers. In some embodiments, second application 750 could have already been processed by application compatibility system 701 that can result in an organization including atomic elements and/or groups of atomic elements. In some embodiments, second application 750 could have already been processed by application compatibility system 701 that can result in an organization including containers and/or containers. In some embodiments, second application 750 could have been processed by a system external to and remote from application compatibility system 701 that can result in an organization including atomic elements and/or groups of atomic elements. In some embodiments, second application 750 can comprise a plurality of applications that need to be tested for compatibility with one or more platforms.

In some embodiments, a compatibility status of second application 850 can already be identified with at least one status icon such as "works" or "doesn't work". A works icon can indicate that second application 750 is likely to be compatible with a target platform. In some embodiments, a works icon can indicate that all atomic elements associated with second application 750 can be marked as known to be compatible with the target platform. This status can be referred to as known good intrinsic data. In some embodiments, a works icon can indicate that all groups of atomic elements associated with second application 750 can be marked as known to be compatible with the target platform, which can be referred to as known good intrinsic data. In some embodiments, known good intrinsic data can be defined as a status that signifies that all atomic elements and/or all groups of atomic elements are more likely or always compatible with the target platform. In some embodiments, a works icon can indicate that all containers and/or all sub-containers associated with second application 850 can be marked as known to be compatible with the target platform, which can be referred to as known good intrinsic data. In some embodiments, known good intrinsic data can be defined as a status that signifies that all containers and/or all sub-containers are more likely or always compatible with the target platform. It will be understood that other definitions of known good intrinsic data are possible.

A doesn't work icon can indicate that second application 750 is likely to or certain to fail compatibility and that second application 750 may further need redevelopment to be compatible with the target platform. In some embodiments, a doesn't work icon can indicate that all atomic elements associated with second application 750 can be marked as possible suspects to cause compatibility failure of second application 750. This status can be referred to as suspect intrinsic data. In some embodiments, a doesn't work icon can indicate that all groups of atomic elements associated with second application 750 can be marked as possible suspects to cause compatibility failure of second application 750, which can be referred to as suspect intrinsic data. In some embodiments, a doesn't work icon can indicate that all containers and/or all sub-containers associated with second application 750 can be marked as possible suspect causes of compatibility failure of second application 750, which can be referred to as suspect intrinsic data.

As more applications (e.g., second application 750) are analyzed and their compatibility statuses are identified, a repository of known good intrinsic data expands. In some embodiments, application status for all applications (e.g., second application 750) can be stored in a memory of server 122 that can host application compatibility system 701. In some embodiments, application status for all applications (e.g., second application 750) can be stored in a memory external to or remote of server 122. As more and more applications (e.g., second application 750) are tested for compatibility with a platform, an increasing number of atomic elements can be marked as known good intrinsic data. In some embodiments, as more and more applications (e.g., second application 750) are tested for compatibility with a platform, an increasing number of containers and/or sub-containers can be marked as known good intrinsic data.

In some embodiments, a database (e.g., intrinsic data database 500 hosted by server 122) can be prepopulated with previously 'learned' status of atomic elements associated with one or more applications (e.g., second application 750). For example, a 'learned' status of atomic elements can be known when applications comprising such atomic elements are verified for compatibility with a particular platform and a status is identified for such atomic elements. Such 'learned' status of atomic elements can include, for example, known good intrinsic data, suspect intrinsic data, and known bad intrinsic data. In some embodiments, the database might not be prepopulated with previously 'learned' status of atomic elements associated with one or more applications.

In some embodiments, a database (e.g., intrinsic data database 500 hosted by server 122) can be prepopulated with previously 'learned' status of containers and/or sub-containers associated with one or more applications (e.g., second application 750). For example, a 'learned' status of containers and/or sub-containers can be known when applications comprising such containers and/or sub-containers are verified for compatibility with a particular platform and a status is identified for such containers and/or sub-containers. Such 'learned' status of containers and/or sub-containers can include, for example, known good intrinsic data, suspect intrinsic data, and known bad intrinsic data. In some embodiments, the database might not be prepopulated with previously 'learned' status of containers and/or sub-containers associated with one or more applications.

In some embodiments, when an application (e.g., second application 750) is tested for compatibility with a platform and a status is identified for the application and its atomic elements, previously identified suspect intrinsic data status can be changed to known good intrinsic data. For example, an atomic element comprising API calls associated with Microsoft Word 2007 application and an operating system can initially be identified with a suspect intrinsic data, if the Word 2007 application is identified with doesn't work status for a given platform. Later, if the compatibility of Microsoft Word 2010 application is tested for the same platform as that of Word 2007, and if Word 2010 application is identified with a works status, then all atomic elements associated with Word 2010 application can be identified with a known good intrinsic data status. In the above-example, if the Word 2010 application comprises the same atomic element associated with API calls as that of as the Word 2007 application, then the API calls atomic element that was previously identified with suspect intrinsic data can now be identified with a modified status of known good intrinsic data for the Word 2007 application.

In some embodiments, when an application (e.g., second application 750) is tested for compatibility with a platform and a status is identified for the application and its containers and/or sub-containers, previously identified suspect intrinsic data status can be changed to known good intrinsic data. For example, a container and/or sub-container comprising API calls associated with Microsoft Word 2007 application and an operating system can initially be associated with a suspect intrinsic data, if the Word 2007 application is associated with doesn't work status for a given platform. Later, if the compatibility of Microsoft Word 2010 application is tested for the same platform as that of Word 2007, and if Word 2010 application is identified with a works status, then all containers and/or all sub-containers associated with Word 2010 application can be identified with a known good intrinsic data status. In the above-example, if the Word 2010 application comprises the same container and/or the sub-container associated with API calls as that of as the Word 2007 application, then the API calls container and/or sub-container that was previously identified with suspect intrinsic data can now be associated with a modified status of known good intrinsic data for the Word 2007 application.

With the testing of more and more applications (e.g., second application 750), the category of atomic elements identified as suspect intrinsic data associated with an application can shrink as more and more elements of the category of atomic elements identified as suspect intrinsic data may be converted to known good intrinsic data. In some embodiments, the category of atomic elements identified as suspect intrinsic data associated with an application (e.g., second application 750) can shrink to a handful of suspect intrinsic data elements. In some embodiments, the suspect intrinsic data elements can be handed over to an individual (e.g., a specialist who specializes in application compatibility) who can analyze the suspect intrinsic data elements and determine whether the suspect intrinsic data is in fact good intrinsic data and change the status accordingly. In some embodiments, the individual can also analyze the suspect intrinsic data elements and identify the reasons that can cause the application to not be compatible for a platform. In some embodiments, the individual analyzing suspect intrinsic data elements can identify atomic elements that caused the application to be incompatible with a particular platform. The identified atomic elements, for example, can be referred to as known bad intrinsic data. In some embodiments, known bad intrinsic data can be defined such that an application (e.g., second application 750) that contains at least one known bad intrinsic data element can fail compatibility for the given platform. It will be understood that other definitions of known bad intrinsic data are possible.

With the testing of additional applications (e.g., second application 750), the category of containers and/or sub-containers identified as suspect intrinsic data associated with an application may shrink as more and more containers and/or sub-containers of the category of containers and/or sub-containers identified as suspect intrinsic data may be converted to known good intrinsic data. In some embodiments, the category of containers and/or sub-containers identified as suspect intrinsic data associated with an application (e.g., second application 750) can shrink to a handful of suspect intrinsic data containers and/or sub-containers. In some embodiments, the handful of suspect intrinsic data containers and/or sub-containers can be handed over to an individual (e.g., a specialist who specializes in application compatibility) who can analyze the suspect intrinsic data containers and/or sub-containers and determine whether the suspect intrinsic data is in fact good intrinsic data and change the status accordingly. In some embodiments, the individual can also analyze the suspect intrinsic data containers and/or sub-containers and identify the reasons that can cause the application to not be compatible for a platform. In some embodiments, the individual analyzing suspect intrinsic data containers and/or sub-containers can identify containers and/or sub-containers that can cause the application to not be compatible for a platform. The identified containers and/or sub-containers, for example, can be referred to as known bad intrinsic data. In some embodiments, known bad intrinsic data can be defined such that an application (e.g., second application 750) that contains at least one known bad intrinsic data container and/or sub-container can fail compatibility for the given platform. It will be understood that other definitions of known bad intrinsic data are possible.

After most, if not all, suspect intrinsic data elements are analyzed, applications (e.g., second application 750) can then be automatically marked with a status icon signifying a compatibility status. In some embodiments, applications can be automatically marked with status icons as follows: works or green icon that can signify that an application comprises only known good intrinsic data elements; doesn't work or red icon that can signify that an application comprises at least one known bad intrinsic data element; or "unknown" or amber icon that can signify that an application comprises either known good intrinsic data elements or suspect intrinsic data elements but not known bad intrinsic data elements. It will be understood that, in some embodiments, other definitions of "works," "doesn't work," and "unknown" status can be used.

After most, if not all, suspect intrinsic data containers and/or sub-containers are analyzed, applications (e.g., second application 750) can then be automatically marked with a status icon signifying a compatibility status. In some embodiments, applications can be automatically marked with status icons as follows: works or green icon that can signify that an application comprises only known good intrinsic data containers and/or sub-containers; doesn't work or red icon that can signify that an application comprises at least one known bad intrinsic data container and/or sub-container; or "unknown" or amber icon that can signify that an application comprises either known good intrinsic data containers and/or sub-containers, or suspect intrinsic data containers and/or sub-containers, but not known bad intrinsic data containers and/or sub-containers. It will be understood that, in some embodiments, other definitions of "works," "doesn't work," and "unknown" status can be used.

In instances where there can be conflicts between known good intrinsic data, known bad intrinsic data, and suspect intrinsic data, the application compatibility system can define a precedence order to resolve such conflicts. For example, a precedence order can be defined such that known good intrinsic data can take precedence over suspect intrinsic data, whereas known bad intrinsic data can take precedence over any other status including known good intrinsic data and suspect intrinsic data. In some embodiments, a date related precedence can be defined. For example, a precedence order can be defined such that a latest status takes precedence over previous statuses irrespective of whether the latest status is either known good intrinsic data or known bad intrinsic data. It will be understood that, in some embodiments, other precedence order definitions are possible.

In some embodiments, when an analyzed application comprises a combination of known good intrinsic data, known bad intrinsic data, and suspect intrinsic data, heuristics can be employed to help in determining the relative importance associated with each of the known good intrinsic data, known bad intrinsic data, and suspect intrinsic data. For example, a different weightage factor can be associated for each of the different intrinsic data elements that can help in determining which elements (or containers/sub-containers) takes precedence over the other. In some embodiments, such determination can be implemented by first detecting dependency trees based off of an executable of an application either by a shortcut or by a trait of being the only executable in the application. After detecting dependency trees, application compatibility system 701 can analyze each of the dependencies, for example, by matching API export and import calls across different assemblies of the application. After such analysis, if it is determined that the known good intrinsic data is comprised within the primary dependency tree, while the suspect intrinsic data is not comprised within the primary dependency tree, application compatibility system 701 can determine that known good intrinsic data status has precedence over other statuses. It will be understood that, in some embodiments, other ways of determining the relative importance between the different statuses can be possible.

Next, FIG. 8 depicts an application compatibility system organizing, at step 805, first application 710's intrinsic data into atomic elements and/or groups of atomic elements. An exemplary organizing step is illustrated in block 1030 of method 1000 of FIG. 10. The process of organizing first application 710's intrinsic data into atomic elements and/or groups of atomic elements can be the same as that of organizing second application 750's intrinsic data into atomic elements and/or groups of atomic elements, as described in FIG. 7's step 705 (an as discussed with regard to step 1020 of method 1000 of FIG. 10). Organizing step 805 can be depicted, for example, using the same element 320 as depicted in FIG. 6. In some embodiments, first application 710 can already be organized into atomic elements and/or groups of atomic elements before request 705 is received.

In some embodiments, application compatibility system organizes first application 710's intrinsic data into containers and/or sub-containers. The process of organizing first application 710's intrinsic data into containers and/or sub-containers may be similar to organizing second application 750's intrinsic data into containers and/or sub-containers, as described in step 705 of FIG. 7 (and with regard to step 1020 of method 1000 of FIG. 10). In some embodiments, first application 710 can already be organized into containers and/or sub-containers before request 705 is received.

FIG. 8 depicts a step (e.g., step 1040 of method 1000 of FIG. 10) of comparing atomic elements of first application 710 with that of atomic elements of second application 750. In some embodiments, comparing step 1040 can be used to identify a compatibility status of first application 710 based on a compatibility status of second application 750 as long as there is at least one atomic element or at least one group of atomic elements in common between first application 710 and second application 750. In some embodiments, when comparing step 1040 is being performed, a compatibility status of second application 750 is already known, identified, and stored in application compatibility system 701. For example, second application 750 can be identified with at least one of the following status icons: works icon that can signify that second application 750 comprises only known good intrinsic data elements for one or more particular platforms; doesn't work icon that can signify that second application 750 comprises at least one known bad intrinsic data element for one or more particular platforms; or "unknown" icon that can signify that second application 750 can only comprise some combination of either known good intrinsic data elements or suspect intrinsic data elements but cannot comprise known bad intrinsic data elements.

In some embodiments, comparing step 1040 includes comparing containers and/or sub-containers of first application 710 with that of containers and/or sub-containers of second application 750. In some embodiments, comparing step 1040 can include identifying a compatibility status of first application 710 based on a compatibility status of second application 750, if there is at least one container and/or one sub-container in common between first application 710 and second application 750. In some embodiments, when comparing step 1040 is performed, a compatibility status of second application 750 is already known, identified, and stored in application compatibility system 701. For example, second application 750 can be identified with at least one of the following status icons: works icon that can signify that second application 750 comprises only known good intrinsic data containers and/or sub-containers for one or more particular platforms; doesn't work icon that can signify that second application 750 comprises at least one known bad intrinsic data container and/or sub-container for one or more particular platforms; or "unknown" icon that can signify that second application 750 can only comprise some combination of either known good intrinsic data containers and/or sub-containers, or suspect intrinsic data containers and/or sub-containers, but cannot comprise known bad intrinsic data containers and/or sub-containers.

Next, in step 1050 of method 1000, a status for first application 710 may be identified based on the comparison between atomic elements of first application 710 with that of atomic elements of second application 750, such as the comparison step described in step 1040 of method 1000. For example, identifying a compatibility status of first application 710 can be based on an identification status of one or more atomic elements or one or more groups of atomic elements of second application 750, as long as there is at least one atomic element or at least one group of atomic elements common between first application 710 and second application 750. While this example refers to atomic elements of second application 750, it is appreciated that the atomic elements that are used for comparing with the first application's atomic elements can be from multiple applications, regardless of whether those multiple applications are related or not to the first application. For example, unrelated applications can use substantially similar or identical modules for making an API call; thus, in similar situations, the atomic elements of an application would correspond with the atomic elements of the unrelated application.

In some embodiments, identifying step 1050 can comprise identifying a status for first application 710 based on the comparison between containers and/or sub-containers of first application 710 with that of containers and/or sub-containers of second application 750, as described with respect to step 1040 of method 1000. For example, identifying a compatibility status of first application 710 can be based on an identification status of one or more containers and/or one or more sub-containers of second application 750, as long as there is at least one container and/or sub-container common between first application 710 and second application 750. While this example refers to containers and/or sub-containers of second application 750, it is appreciated that the containers and/or sub-containers that are used for comparing with the first application's containers and/or sub-containers can be from multiple applications, regardless of whether those multiple applications are related or not to the first application. For example, unrelated applications can use substantially similar or identical modules for making an API call; thus, in similar situations, the containers and/or sub-containers of an application would correspond with the containers and/or sub-containers of the unrelated application.

In some embodiments, identifying step 1050 can comprise a determination whether at least one atomic element of first application 710 is also an atomic element of second application 750. In some embodiments, identifying step 1050 can comprise a determination whether at least one group of atomic elements of first application 710 is also a group of atomic elements of second application 750. If a determination that at least one atomic element or at least one group of atomic elements of first application 710 is also an atomic element or a group of atomic elements of second application 750 (or another application), then the at least one atomic element or the at least one group of atomic elements of first application 710 is automatically marked with the same compatibility status as that of the corresponding atomic element or a group of atomic elements of second application 750. For example, an atomic element comprising API calls associated with Microsoft Word 2007 application (exemplary second application 750) and an operating system can initially be identified with a suspect intrinsic data, for a given platform. Next, if the compatibility of Microsoft PowerPoint 2007 application is tested for the same platform as that of Word 2007, and if PowerPoint 2007 comprises the same atomic element as that of Word 2007, namely, API calls associated with the operating system, then that atomic element of PowerPoint 2007 application is also identified with the same suspect intrinsic data status automatically.

In some embodiments, identifying step 1050 can comprise a determination of whether at least one container and/or sub-container of first application 710 is also a container and/or sub-container of second application 750. If a determination that at least one container and/or sub-container of first application 710 is also an container and/or sub-container of second application 750 (or another application), then the at least one container and/or sub-container of first application 710 is automatically marked with the same compatibility status as that of the corresponding container and/or sub-container of second application 750. For example, a container and/or sub-container comprising API calls associated with Microsoft Word 2007 application (exemplary second application 750) and an operating system can initially be identified with a suspect intrinsic data, for a given platform. Next, if the compatibility of Microsoft PowerPoint 2007 application is tested for the same platform as that of Word 2007, and if PowerPoint 2007 comprises the same container and/or sub-container as that of Word 2007, namely, API calls associated with the operating system, then that container and/or sub-container of PowerPoint 2007 application is also identified with the same suspect intrinsic data status automatically.

In some embodiments, the automatic marking of atomic elements of first application 710 with the same compatibility status as that of the corresponding atomic elements or a group of atomic elements of second application 750 can be performed by server 122 hosting application compatibility system 701. In some embodiments, the automatic marking of containers and/or sub-containers of first application 710 with the same compatibility status as that of the corresponding containers and/or sub-containers of second application 750 can be performed by server 122 hosting application compatibility system 701. In some embodiments such automatic marking can be performed by a client device (e.g., client device 102A-F). In some embodiments, such marking can be performed manually by a user of application compatibility system 701.

In some embodiments, identifying step 1050 can include each atomic element of first application 710 that can be compared with an existing repository of atomic elements with identified statuses and associated with existing applications (e.g., second application 750). Accordingly, each atomic element of first application 710 can be marked with at least one status icon such as known good intrinsic data, known bad intrinsic data, or suspect intrinsic data. In some embodiments, when most, if not all, atomic elements of first application 710 are marked with a compatibility status icon, a compatibility status of first application 710 as a whole can be identified. In some embodiments, a compatibility status of first application 710 can be identified by server 122 hosting application compatibility system 701. In some embodiments, a compatibility status of first application 710 can be identified by client devices 102A-F.

In some embodiments, identifying step 1050 can include each container and/or sub-container of first application 710 that can be compared with an existing repository of containers and/or sub-containers with identified statuses and associated with existing applications (e.g., second application 750). Accordingly, each container and/or sub-container of first application 710 can be marked with at least one status icon such as known good intrinsic data, known bad intrinsic data, or suspect intrinsic data. In some embodiments, when most, if not all, containers and/or sub-containers of first application 710 are marked with a compatibility status icon, a compatibility status of first application 710 as a whole can be identified.

Next, FIG. 9 depicts an exemplary application compatibility system displaying, at step 905 (e.g., step 1060 of method 1000 of FIG. 10), a compatibility status for first application 710 with a given platform. In some embodiments, the compatibility status may be displayed on a graphical user interface (e.g., display 910). For example, the compatibility status can be identified as an element, report 330. In some embodiments, a compatibility status may indicate whether first application 710 is likely to be compatible with the platform, whether the first application 710 may fail or have impaired functionality, or whether first application 710 is likely to or certain to fail. The compatibility status may indicate whether remediation is possible, and/or whether redevelopment of first application 710 may be necessary to make it compatible with the given platform. In some embodiments, a compatibility status of first application 710 may be displayed in an operator interface on a display (e.g., display 224) associated with at least one client device 102A-F. In some embodiments, a compatibility status of first application 710 may be displayed in an operator interface displayed on a display (e.g., display 224) associated with a server 122 hosting application compatibility system 701.

Figure 11:
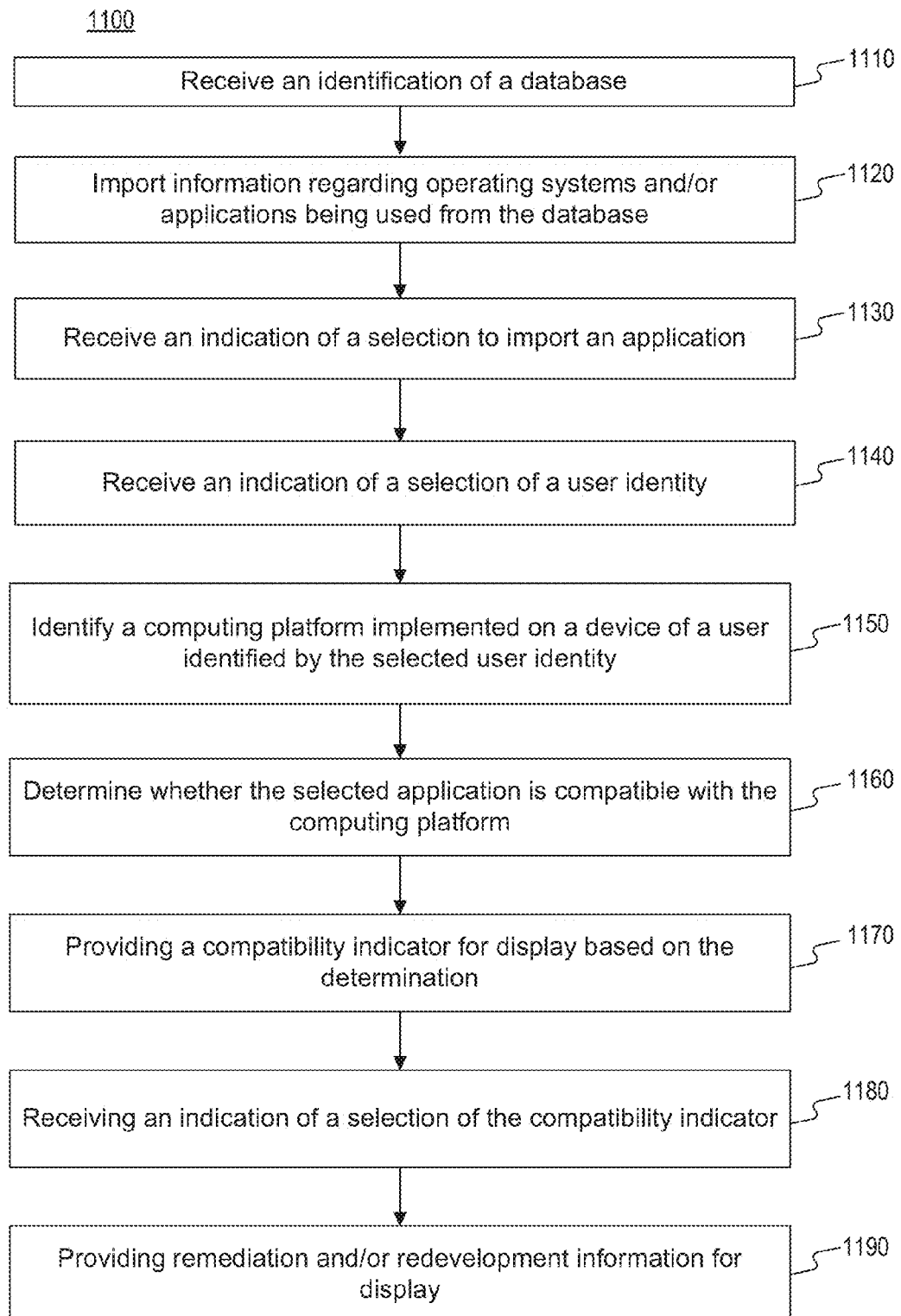
FIG. 11 is a flowchart illustrating an exemplary method for providing an application compatibility status for a given platform, consistent with embodiments of the present disclosure.

FIG. 11 illustrates a flowchart of an exemplary method 1100, consistent with embodiments of the present disclosure. Exemplary method 1100 may be implemented in a computing environment (see, e.g., FIG. 1) using one or more computer systems (see, e.g., FIGS. 2A-2B). Method 1100 may be performed by one or more servers 122, one or more backend systems 130, and/or one or more clients 102A-102F, though the disclosure is not so limited. In some embodiments, method 1100 may be performed as a result of selections an operator makes using a compatibility application. FIGS. 14-26B illustrate exemplary screens of an operator interface of such a compatibility application.

In step 1110, an identification of one or more databases may be received. For example, the identification may be received based on an operator selection of one or more databases in an operator interface of a compatibility application, such as a selection in box 1420 of screen 1400 of FIG. 14. Alternatively, the compatibility application may already be associated with one or more predetermined database(s), and may automatically identify the database(s). The database(s) may be stored on one or more servers 122 and/or backend systems 130, and may store information regarding computing platforms, such as one or more operating systems and/or applications, being used by one or more users of computing devices in computing environment 100. The one or more users may be users of a managed network, such as a network in a business environment, though the disclosure is not so limited. In some embodiments, the database(s) may include one or more databases that use Lightweight Directory Access Protocol (LDAP), Citrix Workflow Studio databases, Windows Active Directory databases, Kerberos databases, domain name service (DNS) databases, and/or any other type of database that stores information regarding users of a network. The database(s) may store information regarding computing platforms implemented on devices of users. For example, in some embodiments, server(s) 122 and/or backend system(s) 130 may track which users use which operating systems and/or applications on their devices. Server(s) 122 and/or backend system(s) 130 may also store files and/or configuration settings of the user devices.

FIGS. 12-26B illustrate exemplary screenshots of operator interfaces for receiving and presenting data related to determining application compatibility (referred to as a "compatibility application" hereinafter), consistent with embodiments of the present disclosure. As used hereinafter, the term "operator" may refer to a network administrator, a member of an IT department, a user of computing environment 100, and/or any other user with access to the compatibility application. The arrangement of icons, text, and/or other graphical elements in the screens of FIGS. 12-26B are provided for purposes of illustration. Additional, fewer, or alternative arrangements of graphical elements may be made, consistent with the present disclosure. Moreover, one would recognize that features, elements, and/or functionality described with reference to the screens in FIGS. 12-26B may be combined into fewer screens and/or removed from screens. One should also recognize that additional features, elements, and/or functionality consistent with embodiments of the present disclosure may be added in one or more of the screens illustrated in FIGS. 12-26B, or in one or more additional screens.

Figure 12:
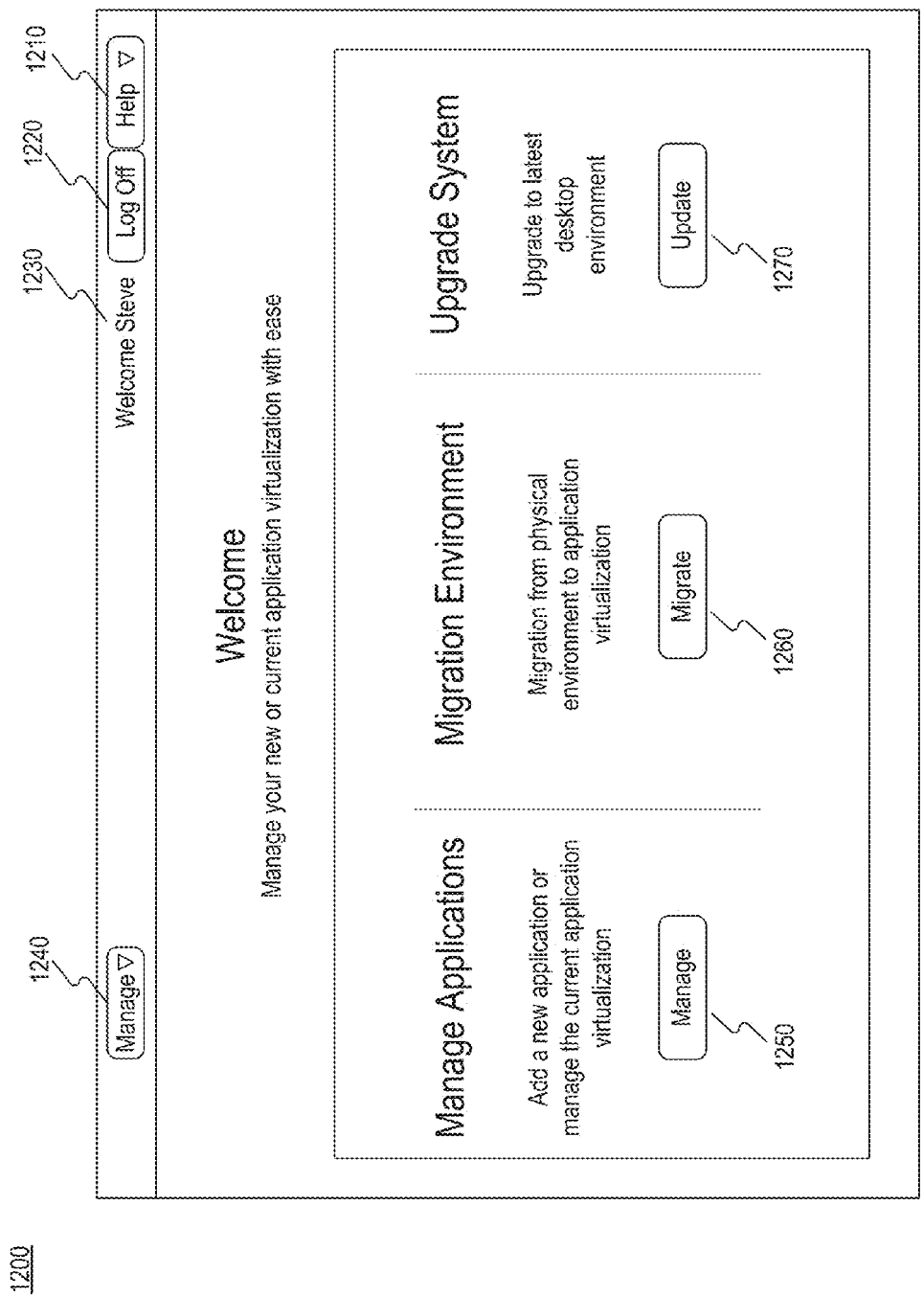

FIG. 12 illustrates an exemplary screen 1200 of an operator interface of a compatibility application. Screen 1200 may be, for example, displayed after an operator opens the compatibility application. Screen 1200 may include a welcome message 1230 to the operator. Screen 1200 may also include a button (e.g., manage button 1250) for managing applications, a button (e.g., migrate button 1260) for migrating an environment, and/or a button (e.g., upgrade button 1270) for upgrading a system. After the selection of any of buttons 1250, 1260, or 1270, additional screens may be presented to the operator for carrying out further operations. For example, additional screens for operations related to managing applications may be presented after a selection of manage button 1250. Additional screens for operations related to migrating an environment may be presented after a selection of migrate button 1260. Additional screens for operations related to upgrading a system may be presented after a selection of upgrade button 1270.

Screen 1200 may also include a link 1220. After selection of link 1220, the compatibility application may log the operator out of the compatibility application. Screen 1200 may further include a link 1210. After selection of link 1210, the compatibility application may provide information in the operator interface to help the operator use the compatibility application. Screen 1200 may still further include a link 1240. After selection of link 1240, the application may provide options in the operator interface that allow the operator to switch between operations for managing an application, migrating an environment, and/or upgrading a system, such as those described hereinafter with reference to buttons 1250, 1260, and 1270. In some embodiments, screen 1300 of FIG. 13 may be displayed after selection of manage button 1250.

Figure 13:
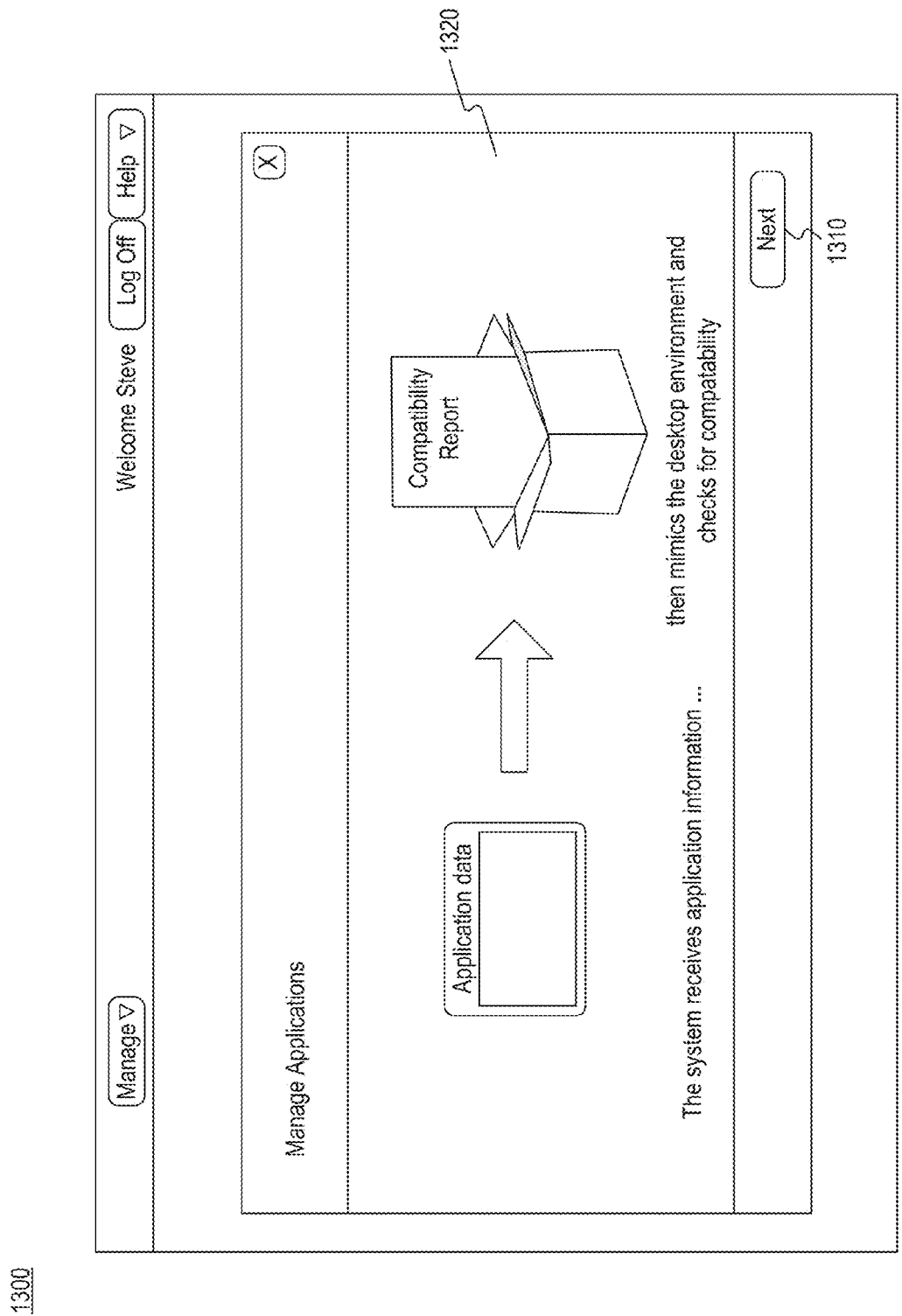

FIG. 13 illustrates an exemplary screen 1300 that may be presented after an operator selects manage button 1250 from screen 1200. FIG. 13 may include context visuals 1320, such as text or diagrams, that provide the operator with information regarding the operations associated with the selection made in screen 1200 (in this case, "manage applications" operations). In some embodiments, screen 1400 of FIG. 14 may be displayed after selection of next button 1310.

Figure 14:
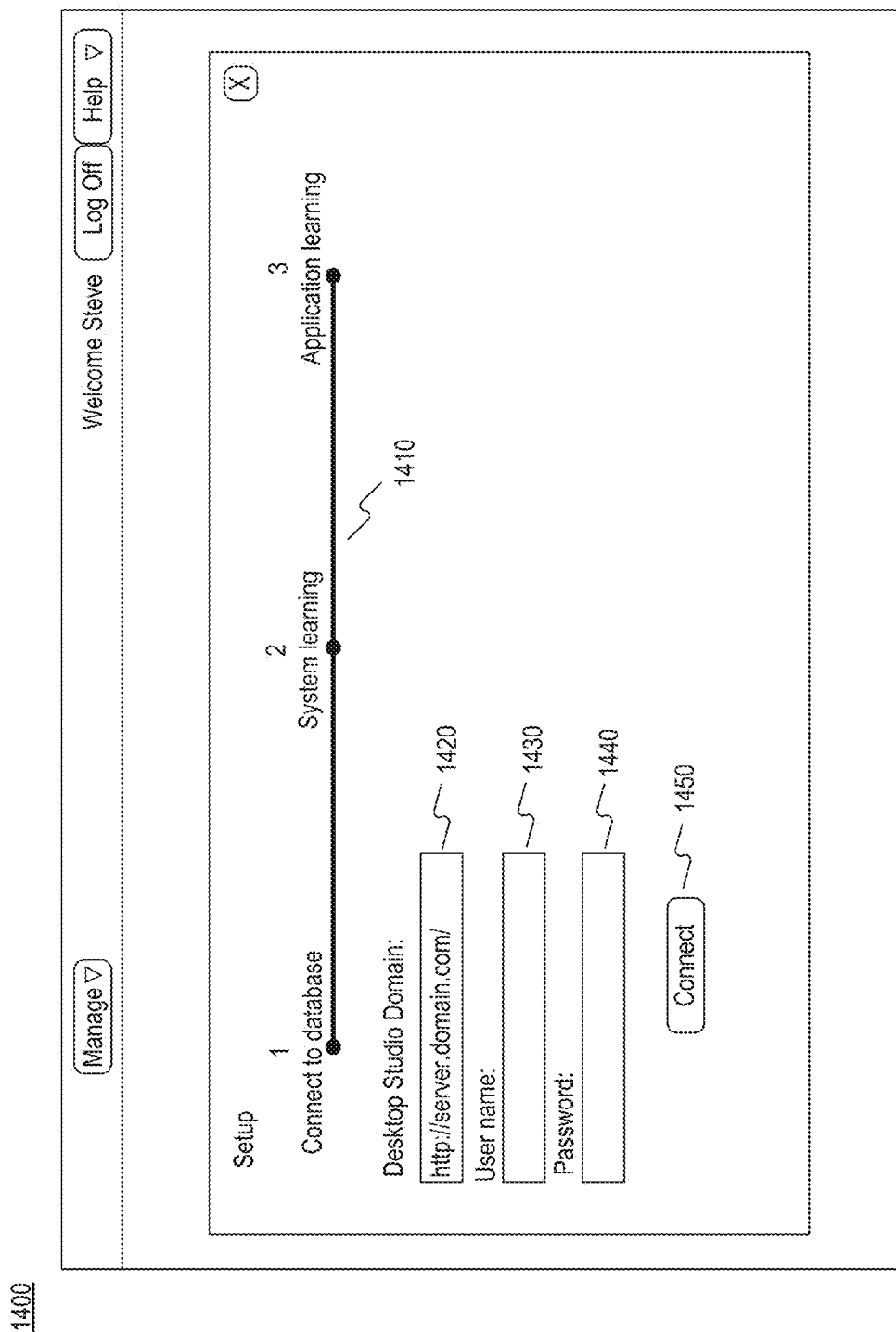

FIG. 14 illustrates an exemplary screen 1400 (e.g., a setup screen) that may be presented after an operator selects next button 1310 from screen 1300. Screen 1400 may include a progress bar 1410 indicating a progress the operator has made through operations associated with managing applications. Screen 1400 may also include a box 1420 that allows the operator to identify one or more databases to use with the compatibility application, such as the database(s) described with reference to step 1110 of method 1100. Although box 1420 is illustrated as a box in which an operator may add text identifying the database(s), one would recognize that other user interface elements known in the art could be used to identify the database(s), such as drop down menus or pop-up menus. Screen 1400 may also include a box 1430 that may allow the operator to enter authentication information, such as his/her user name. Screen 1400 may further include a box 1440 that allows the operator to enter authentication information, such as his/her password. Screen 1400 may still further include a button 1450 (e.g., connect button). After selection of button 1450, the compatibility application may connect with the database(s). For example, a screen, such as screen 1510 of FIG. 15A (further described below), may be displayed after selection of button 1450.

Referring back to FIG. 11, after the database(s) have been identified, method 1100 may proceed to step 1120. In step 1120, information regarding platforms, such as operating system(s) and/or application(s), being used by users of computing devices may be imported from the database(s). For example, the platform information may be imported to one or more servers 122 presenting the compatibility application, or client devices 102A-F presenting the compatibility application. Alternatively, the platform information may be imported from one memory of a computing system to another, such as from a memory 222 or storage device 228 to a main memory 260 or cache 240. In some embodiments, information regarding platforms being used by all of the users of a particular network may be imported in step 1120. Alternatively, an operator may select particular users for which platform information should be imported.

Figure 15A:
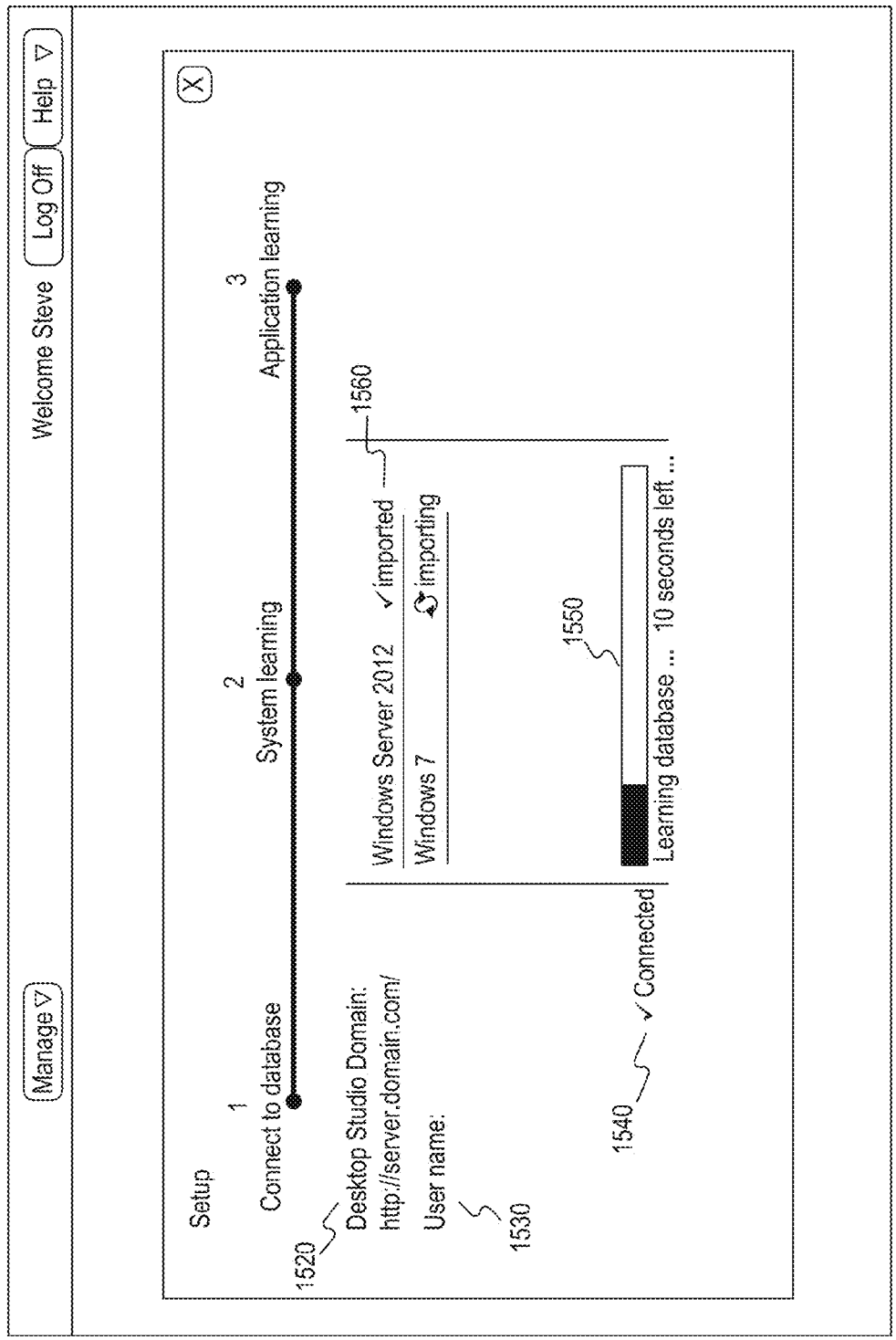

FIG. 15A illustrates an exemplary screen 1510 (e.g., setup screen) that may display a progress of importing operating system information. Screen 1510 may include one or more identification(s) 1520 of the database(s) to which the compatibility application is connected, and/or from which the compatibility application is importing platform information. Screen 1510 may also include the user name 1530 of the operator that has logged into the compatibility application. Screen 1510 may further include a status indicator 1540 indicating that the compatibility application is connected to the database(s). Screen 1510 may still further display status indicators 1550, 1560 that display a status of importing information associated with one or more operating systems used by users of computing devices, such as operating systems being used on computing devices of the users. In some embodiments, the information being imported may include intrinsic data information associated with the platform(s). For example, the intrinsic data information associated with the operating system(s) may include any intrinsic data information associated with the operating system(s), such as that described above with reference to FIGS. 3-10. Status indicator(s) 1560 may indicate a progress (e.g., imported, importing) of importing intrinsic data information for one or more particular operating systems. Status indicator 1550 may indicate an overall progress of importing intrinsic data information for operating systems, and an estimated time remaining until all of the intrinsic data information has been imported for the operating systems.

Figure 15B:
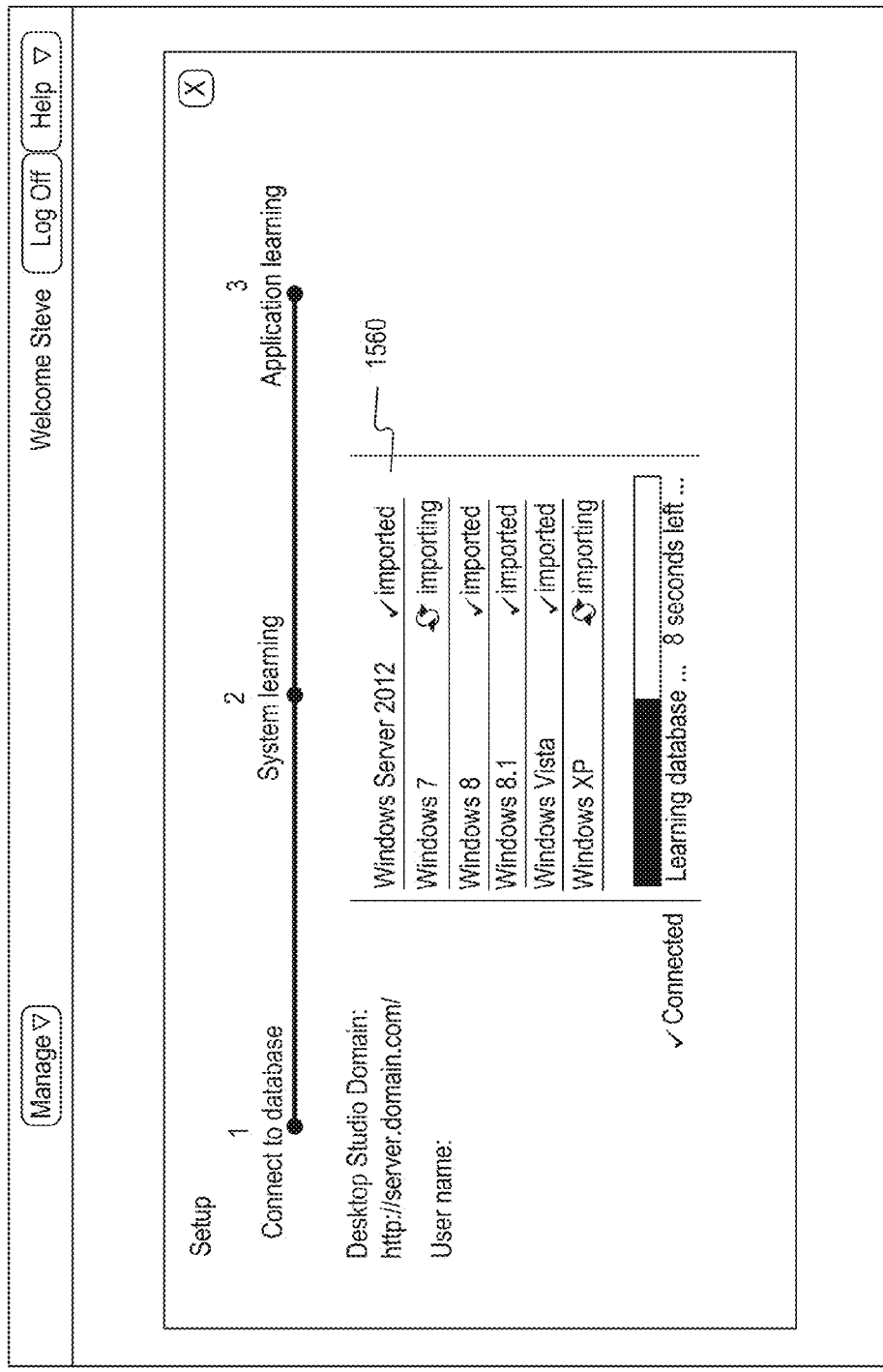

FIG. 15B illustrates an exemplary screen 1565 (e.g., setup screen) that may display a further progress of importing the platform information. For example, progress indicators 1560 may indicate that intrinsic data information for a greater number of the operating systems has been imported than when screen 1510 was presented, and/or that less time remains in importing intrinsic data information than when screen 1510 was presented. In some embodiments, after the information related to operating systems has been imported, a screen, such as screen 1570 of FIG. 15C may be displayed.

Figure 15C:
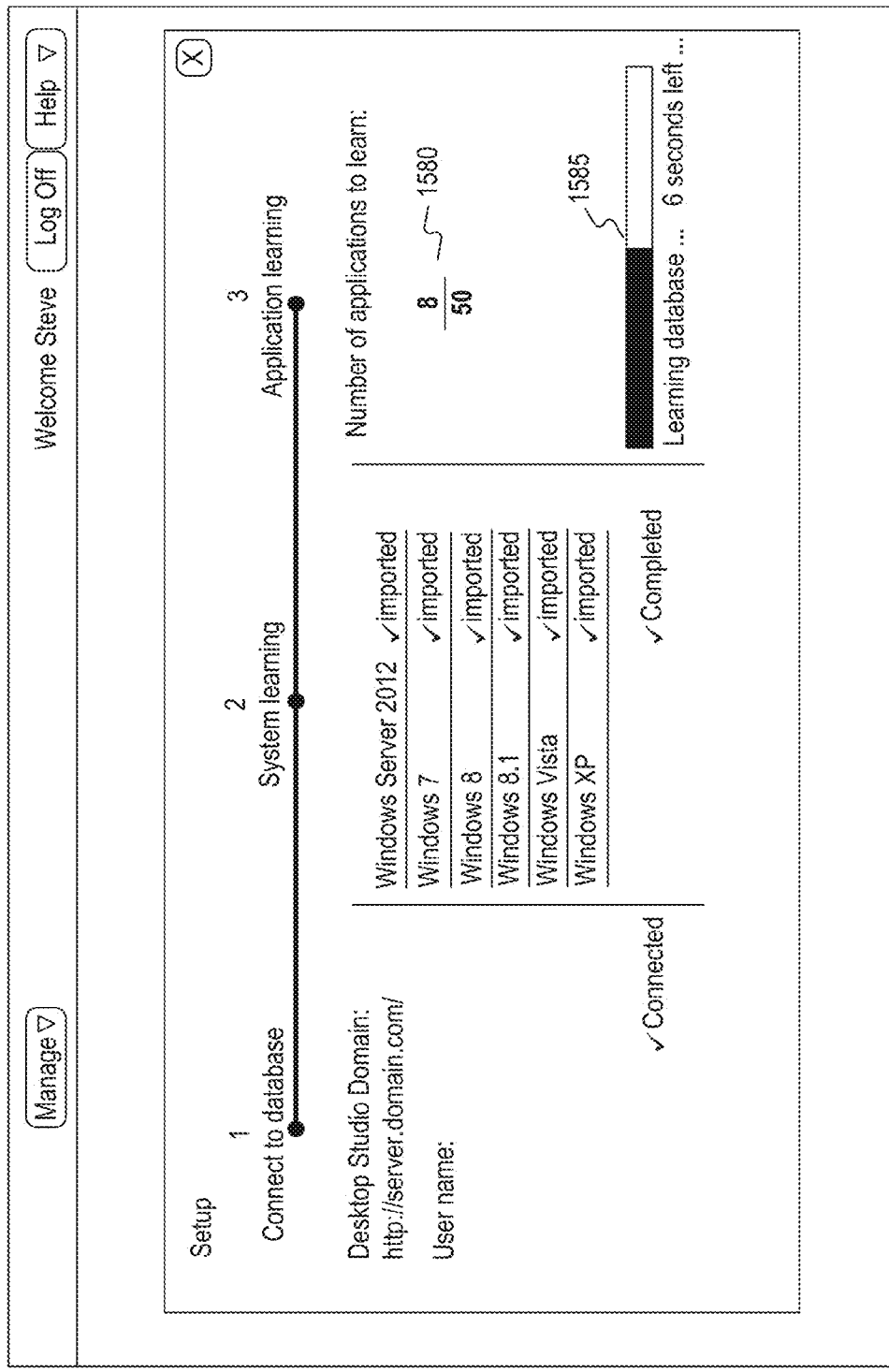

FIG. 15C illustrates an exemplary screen 1570 (e.g., setup screen) that may be displayed after information related to operating systems has been imported. Screen 1570 may display a progress of importing application information. Screen 1570 may include status indicators 1580, 1585 that display a status of importing information associated with one or more applications used by users in computing environment 100, such as applications being used on computing devices of the users. In some embodiments, the information being imported may include intrinsic data information associated with the application(s). For example, the intrinsic data information associated with the application(s) may include any intrinsic data information associated with the application(s), such as that described above with reference to FIGS. 3-10. Status indicator 1580 may indicate a progress of importing intrinsic data information for the application(s). For example, status indicator 1580 may indicate a number of applications for which intrinsic data information has been imported (e.g., 8), and a total number of applications for which intrinsic data information is being imported (e.g., 50). Status indicator 1585 may indicate an overall progress of importing intrinsic data information for applications, and an estimated time remaining until all of the intrinsic data information has been imported for the applications.

Figure 15D:
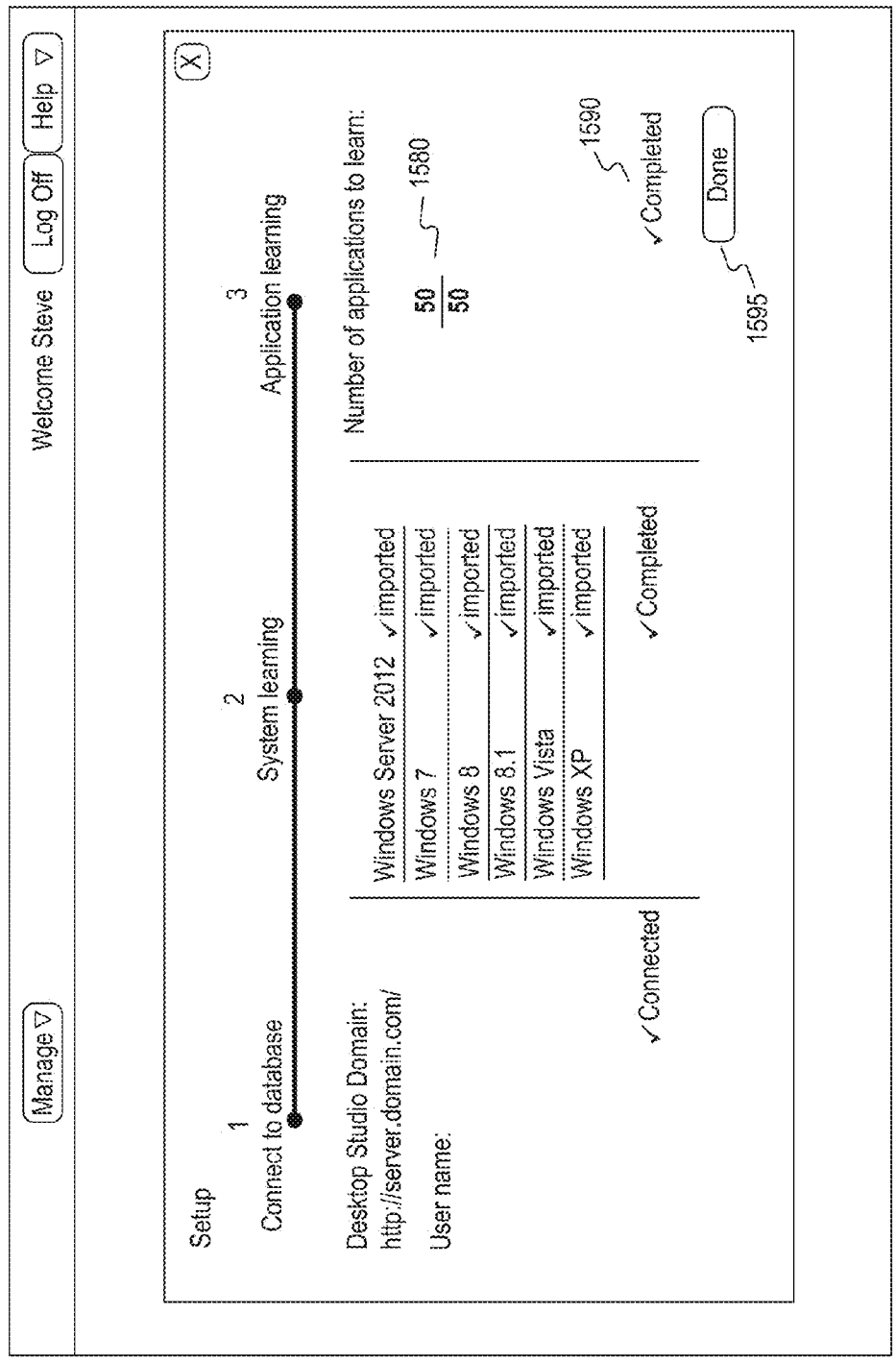

FIG. 15D illustrates an exemplary screen 1587 (e.g., setup screen) that may display a further progress of importing the platform information. For example, progress indicator 1580 may indicate that intrinsic data information for all of the applications has been imported. Indicator 1590 may indicate that the process of importing intrinsic data information for applications has completed. In some embodiments, after selection of button 1595 (e.g., done button), screen 1600 of FIG. 16 (further described below) may be displayed.

Referring back to FIG. 11, after the platform information has been imported, method 1100 may proceed to step 1130. In step 1130, an indication of a selection to import an application may be received. For example, the indication may be received after an operator selects one or more applications to import for compatibility testing. Such selection(s) may occur after an operator makes one or more selections in one more operator screens of the compatibility application, such as screens 1600-1900 of FIGS. 16-19. The application(s) may be selected from a directory listing the application(s) stored on one or more local storage devices, such as one or more memories 222, storage devices 228, and/or caches 240. A directory may also list the application(s) stored on one or more servers 122, backend systems 130, and/or any other remote storage location. In some embodiments, the directory may list applications stored on an installation device 216. In some embodiments, the operator may receive or download the application in response to a request for access to the application by a user. For example, a user in a particular business unit, such as a marketing department, may request access to a particular application, such as Microsoft PowerPoint. In response, the operator may select the PowerPoint application for testing its compatibility with the user's computing platform.

Figure 16:
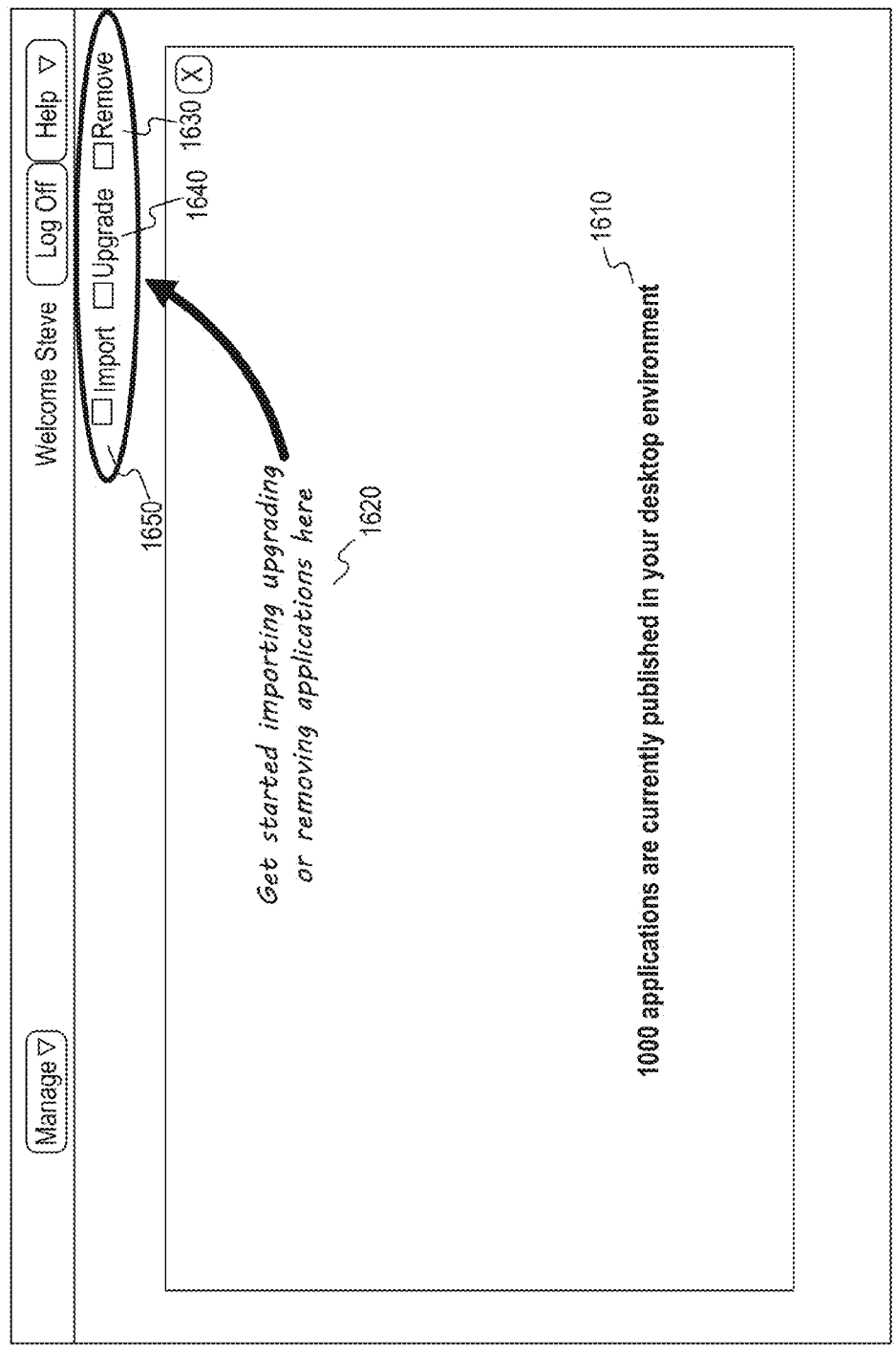

FIG. 16 illustrates an exemplary screen 1600 that may be used for managing applications. Screen 1600 may include an instruction message 1620 to the operator. Screen 1600 may also include a message 1610 indicating the number of applications that are available to the compatibility application. For example, the number indicated by message 1610 may indicate the number of applications 128 that are stored in one or more data center(s) 120. Screen 1600 may further include buttons 1650, 1640, 1630. An operator may select button 1650 (e.g., import button) when he/she wishes to import a new application for compatibility testing. An operator may select button 1640 (e.g., upgrade button) when he/she wishes to upgrade an application on a user's device to a newer version of the application, and wishes to test the upgraded version for compatibility. The newer version of the application may or may not already be stored in data center(s) 120. An operator may select button 1630 (e.g., remove button) when he/she wishes to remove an application on a user's device, and wishes to test the effect of removing the application. In some embodiments, after selection of import button 1650, screen 1700 of FIG. 17 may be displayed.

Figure 17:
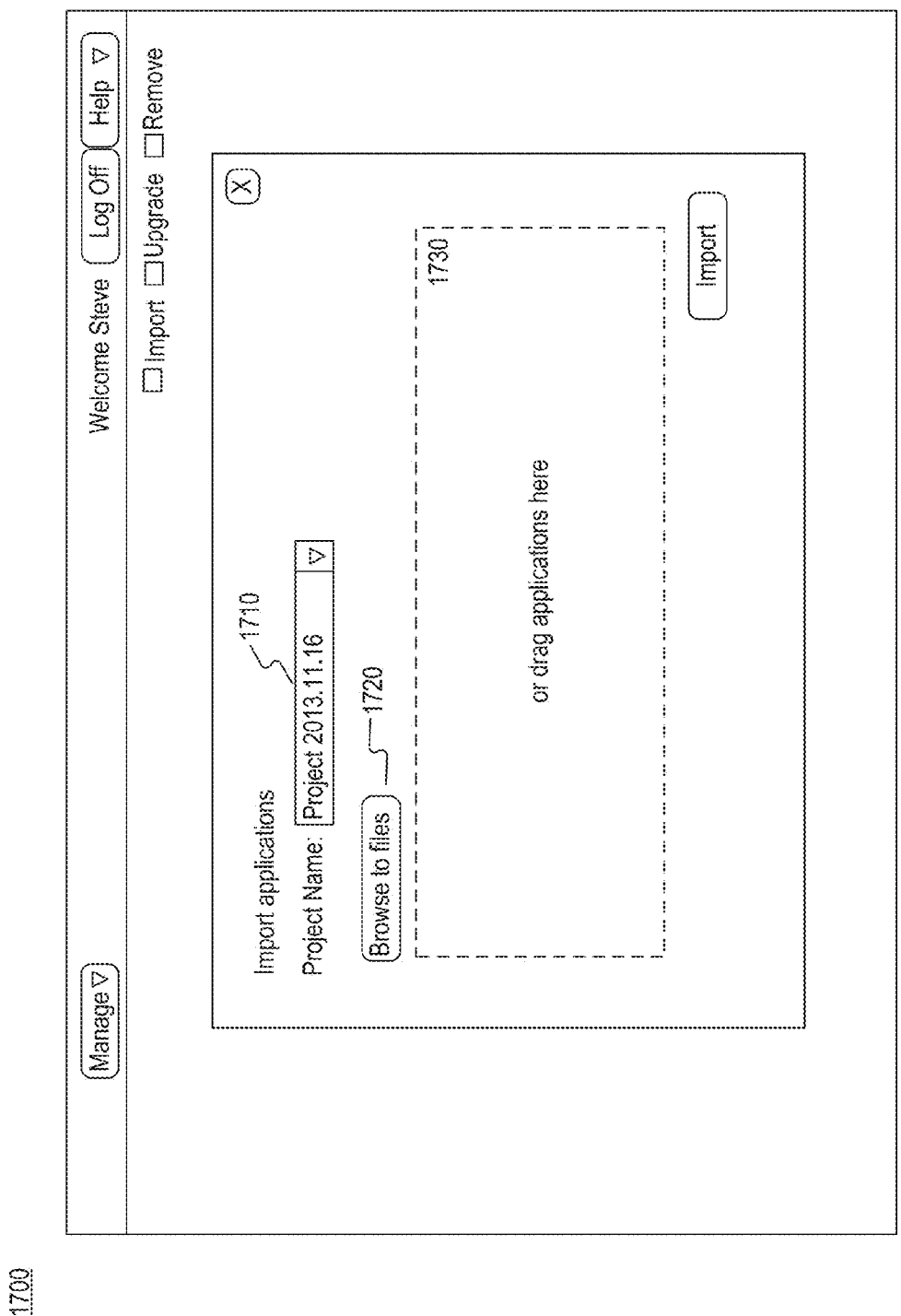

FIG. 17 illustrates an exemplary screen 1700 that may be displayed after selection of import button 1650 from screen 1600. Screen 1700 may be used by an operator for selecting one or more applications for compatibility testing. Screen 1700 may include a box 1710 in which the operator can select a name for the particular compatibility testing project. Button 1720 (e.g., browse to files button) may allow the operator to open a directory for browsing to one or more storage locations where the one or more desired applications for testing are stored. Alternatively, an operator may select one or more applications by dragging the application file(s) into box 1730. In some embodiments, after selection of browse to files button 1720, screen 1800 of FIG. 18 may be displayed.

Figure 18:
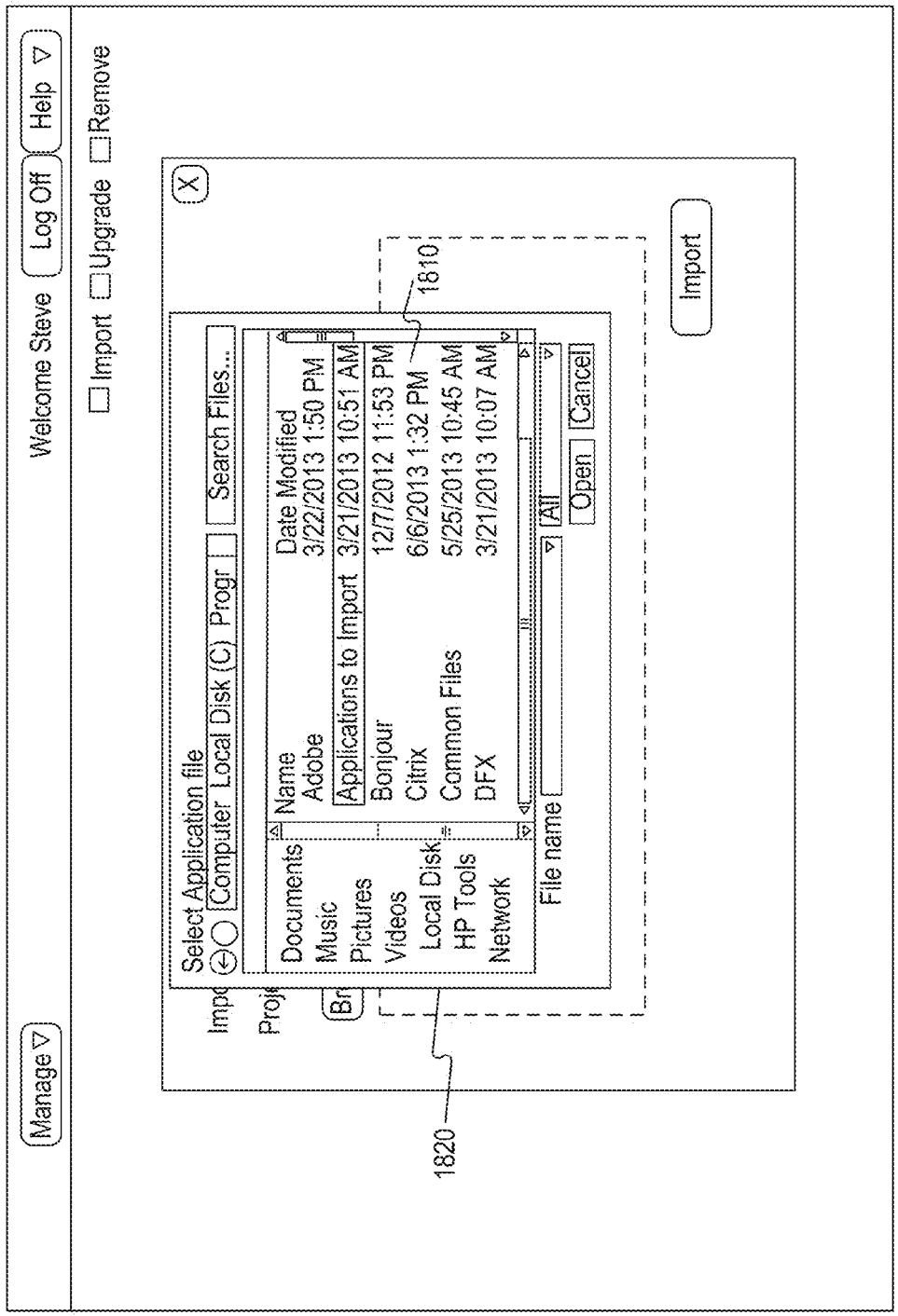

FIG. 18 illustrates an exemplary screen 1800 that may be displayed after selection of browse to files button 1720 from screen 1800. Screen 1800 may present a listing 1820 of one or more directories. Screen 1800 may also present a listing 1810 of one or more files and/or folders within a particular directory selected from listing 1820. Listing 1810 and/or listing 1820 may allow an operator to navigate through one or more storage locations (e.g., memories 222, installation devices 216, storage devices 228, caches 240) to select one or more applications for compatibility testing. In some embodiments, after selection of one or more applications from listing 1810 and/or listing 1820, screen 1900 of FIG. 19 (further described below) may be displayed.

Referring back to FIG. 11, after one or more applications have been selected, method 1100 may proceed to step 1140. In step 1140, an indication of a selection of a user identity may be received. A user identity may refer to a user, or a group of users. An operator may select one or more user identities from a list of identities displayed in a screen, such as screens 2000-2100 of FIGS. 20-21. For example, as previously described above, the compatibility application may have access to one or more database(s) including directory information of users of computing environment 100. The database(s) may also include information on groups of users, such as users that work in a particular department or on a particular project team. An operator may wish to test the compatibility of one or more applications with devices of one or more users and/or user groups. For example, a particular user may desire an application and the operator may wish to test the compatibility of the application with the user's computing platform before installing the application on the user's device. As another example, an operator may wish to install an application, such as Microsoft PowerPoint, on all of the devices of users of a marketing department, and may wish to test the compatibility of the Microsoft PowerPoint application with each of the users' computing platforms before installing the applications on their devices.

Figure 19:
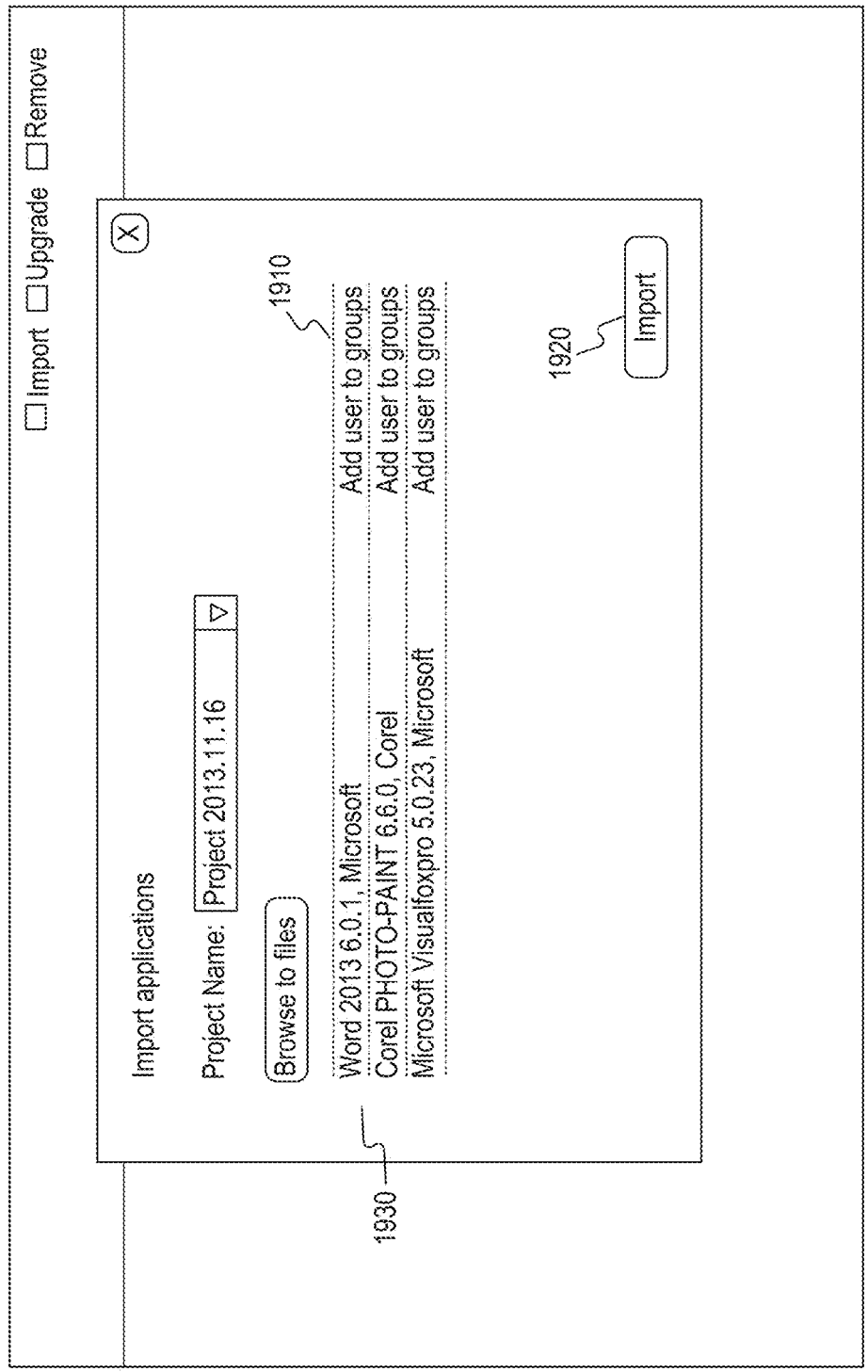

FIG. 19 illustrates an exemplary screen 1900 that may be displayed after selection of one or more applications from screen 1800. Screen 1900 may include a listing 1930 of the applications that have been selected for compatibility testing. In the example shown in screen 1900, three different applications have been selected. Screen 1900 may present options 1910 to associate one or more users and/or user groups with each of the applications. In some embodiments, screen 2000 of FIG. 20 may be displayed after a selection of an option 1910 to associate one or more users and/or user groups with a Word 2013, 6.0.1 application.

Figure 20:
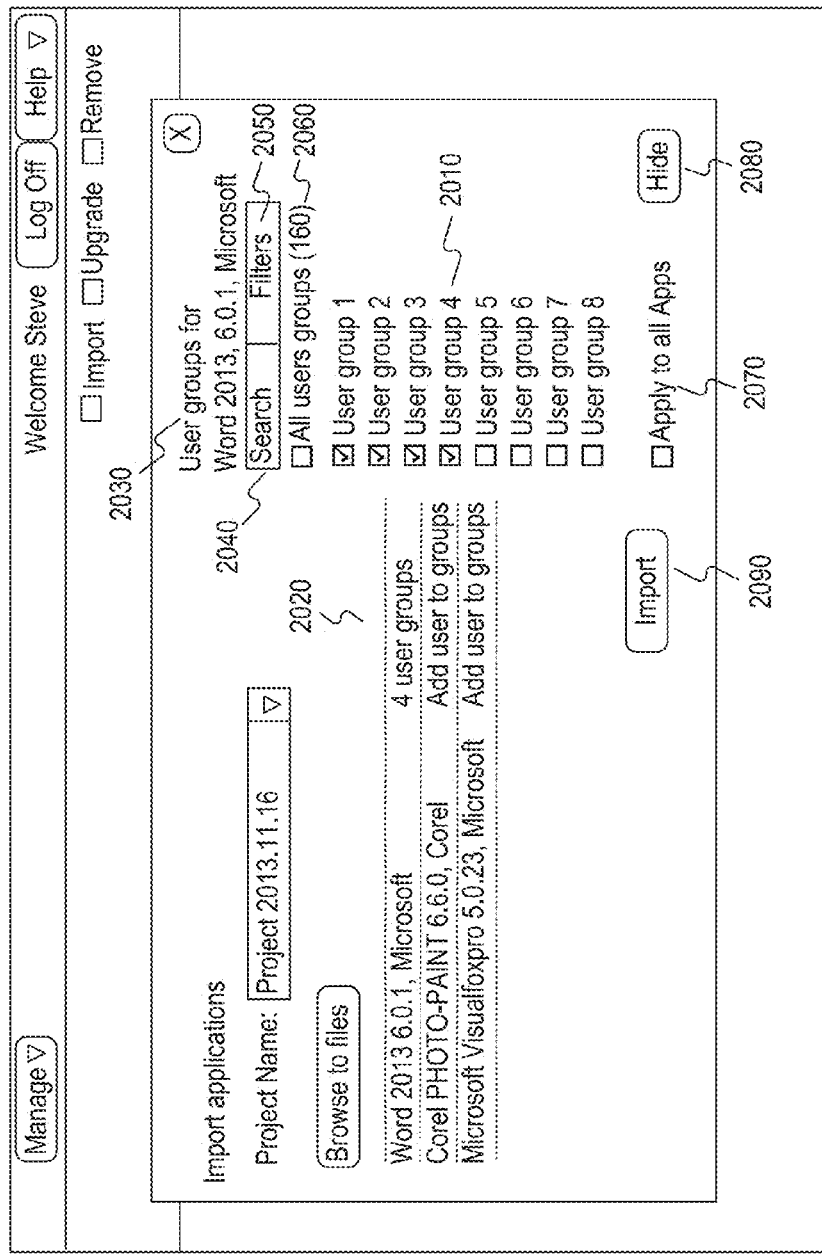

FIG. 20 illustrates an exemplary screen 2000 that may be displayed after selection of an option to associate one or more users and/or user groups with a particular application for compatibility testing, such as the option 1910 associated with a Word 2013, 6.0.1 application in screen 1900. Screen 2000 may provide a listing 2010 of one or more user identities from which the operator can select. The user identities may correspond to individual users and/or user groups. Listing 2010 may be provided based on information from the database(s) storing directory information of users, such as was disclosed above. Screen 2000 shows an example in which user groups are listed, and the operator has selected to test the compatibility of the Word 2013, 6.0.1 application with computing platforms of devices of users in user groups 1, 2, 3, and 4. Screen 2000 includes an indication 2020 that four user groups have been selected for testing with the Word 2013, 6.0.1 application.

Screen 2000 may provide a message 2030 to the operator confirming the application for which he/she is choosing user identities for compatibility testing. Screen 2000 may also provide a search bar 2040. An operator may enter a character string into search bar 2040 to search for one or more users and/or user groups. Screen 2000 may also include a filters drop down menu 2050. An operator may select an option from filters drop down menu 2050 to filter out users and/or user groups that do not match a filtering condition in order to limit the number of users and/or user groups displayed in the listing 2010 of user identities. Screen 2000 may also include an all user identities option 2060. After selection of this option by the operator, all of the users and/or user groups displayed in listing 2010 may be selected for compatibility testing. Screen 2000 may also include a selection box 2070 (e.g., apply to all apps box). After selection of box 2070, all of the user identities selected in listing 2010 may be associated with all of the applications listed in application listing 1930. Screen 2000 may further include a button 2080 (e.g., hide button). After selection of button 2080, listing 2010 may be hidden from display. Screen 2000 may still further include a button 2090 (e.g., import button) for importing each of the applications and testing each of the applications with devices of the user identities with which they have been associated. After selection of import button 2090, a screen, such as screen 2200 of FIG. 22, may be displayed.

Figure 21:
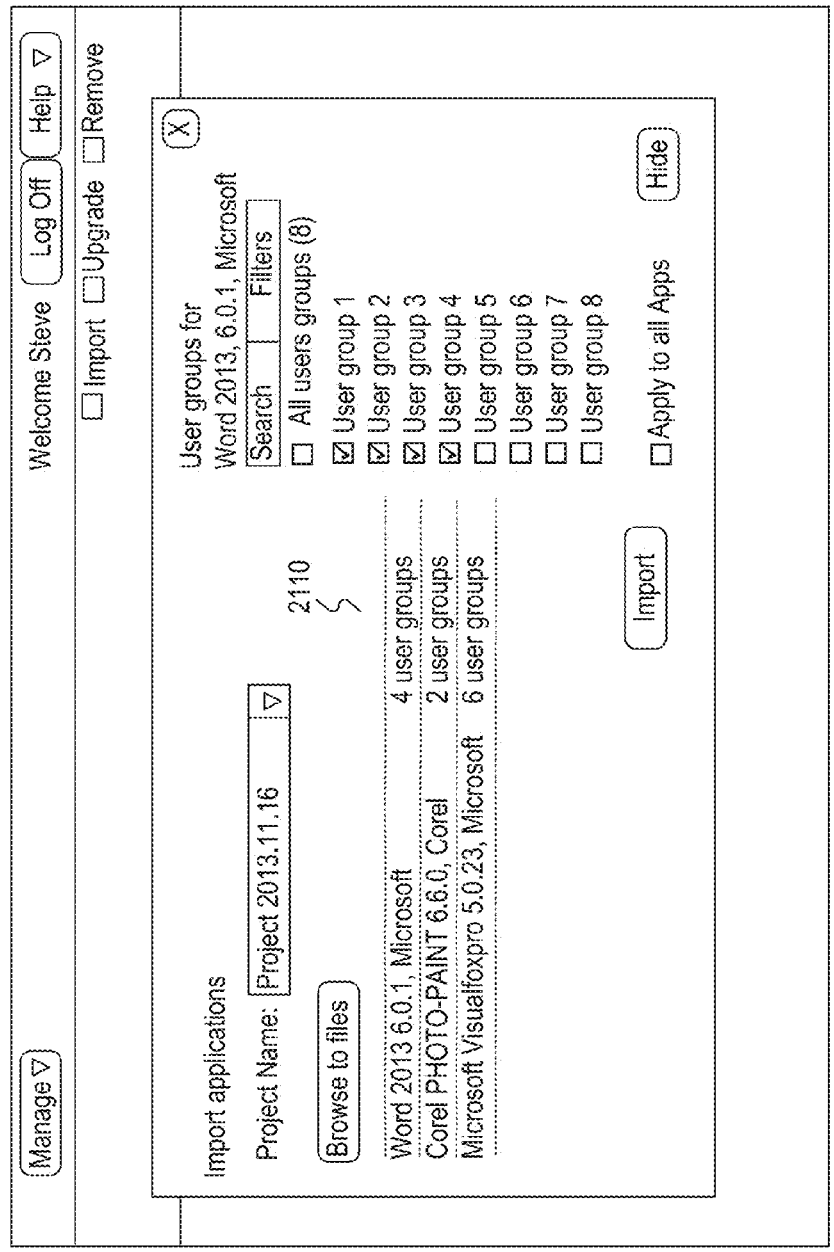

FIG. 21 illustrates an exemplary screen 2100 that may be displayed after an operator selects to associate one or more user identities with other applications displayed in application listing 1930. Screen 2100 may include indicators 2110 that include the number of users and/or user groups associated with each application. In the example shown in screen 2100, indicators 2110 indicate that four user groups have been associated with a Word 2013 application for testing, two user groups have been associated with a Corel application for testing, and six user groups have been associated with a Microsoft Visualfoxpro application for testing.

Referring back to FIG. 11, after one or more applications and one or more user identities have been selected, method 1100 may proceed to step 1150. In step 1150, computing platforms of devices of users corresponding to the selected user identities can be identified. For example, based on the directory information received from the database(s), it may be determined that a selected user group has users with devices using Windows XP, and has users with devices using Windows Vista. Identifying the computing platforms may include retrieving the intrinsic data information associated with those platforms. The intrinsic data information may be any of the intrinsic data information disclosed herein.

After the computing platform(s) have been identified in step 1150 of method 1100, method 1100 may proceed to step 1160. In step 1160, method 1100 may determine whether the selected application(s) are compatible with the computing platform(s) of devices of the users that have been associated with the application(s) (e.g., in screens 1900-2100). Step 1160 may be implemented using method 1000 of FIG. 10, for example. That is, a selected application may be analyzed to identify its intrinsic data information. The application's intrinsic data information may then be compared with intrinsic data information associated with a computing platform of a device used by an identified user. An application's intrinsic data and/or the intrinsic data information associated with a computing platform may be derived and/or compared using any of the systems and/or methods disclosed herein, and/or disclosed in U.S. Provisional Application No. 61/894,786, and/or in U.S. Provisional Application No. 61/951,403, both of which are incorporated herein by reference in their entireties. Based on this comparison, a compatibility status of the application with the computing platform may be identified. Method 1000 may be repeated for each unique compatibility determination that needs to be performed between a selected application and a computing platform. For example, if an operator selected to determine the compatibility between the Word application of screen 2000 and two users having the same computing platform (e.g., both use Windows XP), the comparison may only need to be performed once to determine that the Word application is compatible with both users.

Figure 22:
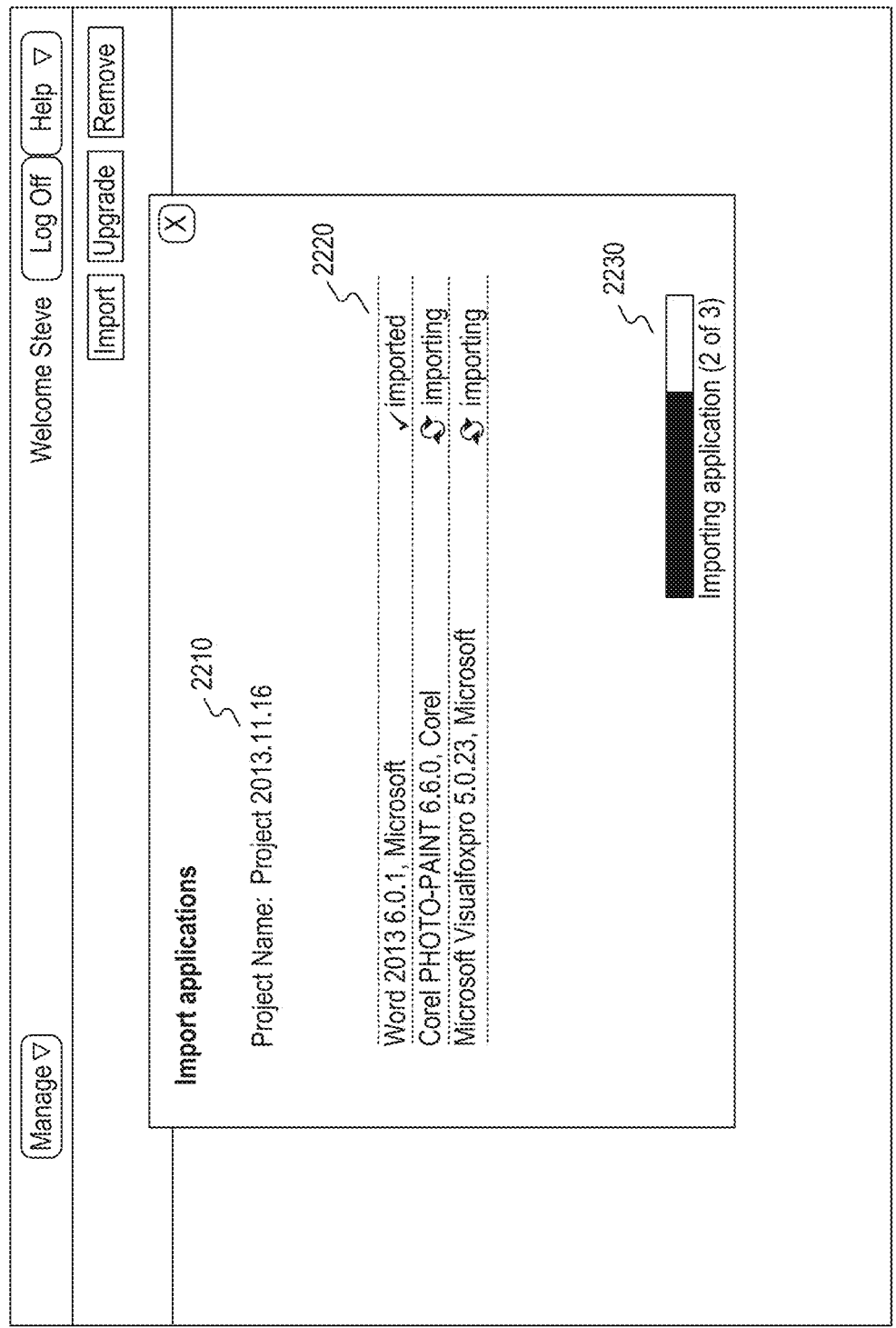

FIG. 22 illustrates an exemplary screen 2200 that may be displayed after the operator selects the import button 2090 in screen 2100. Screen 2200 may include an indication of a compatibility project name 2210. Screen 2200 may also include status indicators 2220, 2230 that display a status of importing information associated with the applications. In some embodiments, the information being imported may be intrinsic data information associated with the applications. For example, the intrinsic data information associated with the application(s) may include any intrinsic data information associated with the application(s), such as that described above with reference to FIGS. 3-10. Status indicator(s) 2220 may indicate a progress (e.g., imported, importing) of importing intrinsic data information for one or more applications. Status indicator 2230 may indicate an overall progress of importing intrinsic data information for the applications. In some embodiments, indicator 2230 may also include an estimated time remaining until all of the intrinsic data information for the applications has been imported. In some embodiments, status indicators 2220, 2230 may indicate a progress of determining the intrinsic data information associated with the applications, and of comparing that intrinsic data information with intrinsic data information associated with one or more computing platforms.

Referring back to FIG. 11, after step 1160 of method 1100 has completed and the compatibility status(es) between application(s) and computing platform(s) has been determined, method 1100 may proceed to step 1170. In step 1170, one or more compatibility indicators indicating the compatibility between application(s) and computing platform(s) may be provided for display. For example, after a screen indicating the progress of the step 1160, such as screen 2200, is displayed, a screen, such as screen 2300 of FIG. 23 may be displayed indicating the compatibility status(es) between application(s) and computing platform(s).

FIG. 23 illustrates an exemplary screen 2300 that may be displayed after compatibility determinations between application(s) and computing platform(s) have been made. Screen 2300 may include an identifier 2320 identifying the compatibility project name and indicating that screen 2300 is a result of the compatibility determinations. Screen 2300 may also include a search bar 2340 allowing an operator to enter a character string and search for particular applications or user groups in screen 2300 that match the character string. Screen 2300 may also include a drop down menu 2345 for selecting to filter the information displayed in screen 2300, so that only information that satisfies the filtering criteria is displayed.

Screen 2300 may include one or more indicator(s) 2380 for indicating the applications that were selected for compatibility determination(s). Screen 2300 may also include one or more indicator(s) 2390 of user identities that were selected (e.g., from listing 2010) for each of the applications. Screen 2300 may further include an indicator 2375 indicating when an application was last tested for compatibility with one or more computing platforms. Screen 2300 may also include an indicator 2360 indicating the different computing platforms implemented by users in a user group. Screen 2300 may further include indicator 2330 indicating a number of user groups that were selected that use a particular computing platform. Screen 2300 may also include one or more indicator(s) 2350 indicating a compatibility status between an application and a computing platform. Indicator(s) 2350 may also indicate a number of issues that need to be resolved to make the particular application compatible with the computing platform. Screen 2300 may also include one or more indicator(s) 2365 indicating a compatibility status between another application and another computing platform. Screen 2300 may further include one or more indicator(s) 2370 indicating a compatibility status between yet another application and yet another computing platform. Screen 2300 may display results of the compatibility determinations in an application view by selecting a button 2310 (application view button). In FIG. 23, screen 2300 is an example of the application view. Screen 2300 may also display results of the compatibility determinations in a system view by selecting a button 2315 (system view button). In a system view, the applications being displayed and the operating systems being displayed in screen 2300 may be swapped, so that the operating systems (e.g., Windows 7, Windows 8, etc.) may be displayed along the left side of the screen (rather than the applications), and the applications may be displayed on the right in place of indicator(s) 2350, 2365, and 2370.

In the example illustrated in FIG. 23, screen 2300 indicates that an operator had selected to determine compatibility between a Word 2013 application and computing platforms implemented among four different user groups. Four of the user groups have users using Windows Vista, two of the user groups have users using Windows XP, two of the user groups have users using Windows 7, and two of the user groups have users using Windows 8. Of these, the Windows Vista and Windows XP platforms were identified as being compatible with the Word 2013 application. The Windows 7 and Windows 8 platforms were identified as being incompatible with the Word 2013 application. For users using the Windows 7 and Windows 8 platforms, issues were identified.

FIG. 24 illustrates an exemplary screen 2400 that may be displayed after an operator using a screen, such as screen 2300, selects the user groups indicator 2390. The user may make this selection by clicking on indicator 2390, by moving a mouse or pointer over indicator 2390, or by pressing indicator 2390 on a touch screen interface. In response to the selection of indicator 2390, a listing 2410 of the four different user groups may be shown. The example listing 2410 in screen 2400 indicates that the four different user groups are Finance CA Santa Cruz, Marketing Team Group, Group Citrix Help Desk, and Messaging Services. Similarly, after selection of any of indicator(s) 2330 or 2360, a listing of the different user groups may be presented. For example, after selection of indicator 2330, a listing of the four user groups in the Windows Vista Pool may be presented.

FIGS. 25A-25B illustrate exemplary screens 2510 and 2520 that may be displayed after an operator scrolls or moves a mouse or pointer over a particular indicator 2360. For example, in screen 2510 of FIG. 25A, an operator has scrolled over Windows 7 Pool, and indicators 2540 are highlighted indicating that, for the users using Windows 7, issues were identified with the compatibility between Windows 7 and Word 2013, and with the compatibility between Win Server 2012 and Word 2013. Indicators 2540 further illustrate a number of the issues that were identified. As another example, in screen 2520 of FIG. 25B, an operator has scrolled over Windows 8 Dedicated, and indicators 2560 are highlighted indicating that, for the users using Windows 8, issues were identified between the compatibility of Windows 8 and Word 2013, and with the compatibility between XenApp Streamed and Word 2013. Indicators 2560 further illustrate a number of the issues that were identified.

Referring back to FIG. 11, after step 1170 has completed and the compatibility indicators have been displayed, such as in screen 2300 of FIG. 23, method 1100 may receive an indication of a selection of a compatibility indicator in step 1180. For example, the operator may select one of indicators 2350 or indicators 2365 in order to identify which issues need to be fixed to make an application compatible with a computing platform. After such a selection in step 1180, step 1190 of method 1100 may provide remediation and/or redevelopment information in an issue report for display in a screen, such as screen 2610 of FIG. 26A and screen 2620 of FIG. 26B. Screens 2610 and 2620 may depict different parts of the same issue report. For example, an operator viewing screen 2610 may need to scroll the screen down to view screen 2620. Screen 2610 of FIG. 26A may include an indicator 2615 of the application with the compatibility issue, and an indicator 2623 of the computing platform with which the application has the compatibility issue. Screen 2610 may also include icons 2635, 2640, 2645, and 2650 which may be selected for printing, saving, e-mailing, or archiving the issue report, respectively. Screen 2610 may further include an indication of when the compatibility between the application and the computing platform was last tested. Screen 2610 may also indicate a module 2625 with which the compatibility was last tested (e.g., in Virtualization Manager). Screen 2610 may further indicate a location 2630 where test data from the last compatibility test is stored.

Screen 2610 may indicate the type of test image 2660 that was used for the computing platform (e.g., a default OS image combination). Screen 2610 may also indicate issues to fix 2665, such as machine level components 2670. The listed issues to fix 2665 may include an indication of a manifestation 2675 of an issue, and/or a solution 2680 for fixing an issue. Screen 2610 may also include an indication of a group 2685 of the components that were tested in the compatibility test, and the results 2690 of the component tests. As shown in FIG. 26B, screen 2620 may further indicate filenames 2692 of files that were tested, indications of file paths 2694 for the files that were tested, indications of versions 2696 of the files that were tested, and indications of the functions 2698 of the files that were tested.

While not depicted in the screen shots, other functions of the compatibility application may operate similar to that described above. For example, FIGS. 17-26B refer to a situation in which a user is importing one or more applications for testing application compatibility with one or more computing platforms used by devices of users in computing environment 100. If, in screen 1600 of FIG. 16, the operator selects upgrade button 1640 instead of import button 1650, the compatibility application may operate similarly to that discussed above. The operator may select an upgraded version of an application, and may test that application's compatibility with computing platforms of devices of users that wish to use the upgraded version of the application. If, in screen 1600 of FIG. 16, the operator selects remove button 1630 instead of import button 1650, the compatibility application may operate similarly to that discussed above. The operator may select an application to remove from user devices, and may test the effects that removing those applications would have on the computing platforms of those devices.

If, in screen 1200 of FIG. 12, the operator selects migrate button 1260 instead of manage button 1250, the compatibility application may operate similarly to that discussed above. Selection of migrate button 1260 may identify applications that a user is using on his/her device, and may test the compatibility of one or more of those applications for compatibility with a virtual environment, such as a Windows environment in a virtual desktop program (e.g., XenDesktop). In some embodiments, each of the applications, or a majority of the applications, that are stored on a user's device may be tested for compatibility with the virtual environment. This may result in a screen similar to screen 2300 of FIG. 23, but with a very large number of applications and compatibility statuses being displayed, and a large number of issue reports to review.

If, in screen 1200 of FIG. 12, the operator selects upgrade button 1270 instead of manage button 1250, the compatibility application may operate similarly to that discussed above. Selection of upgrade button 1270 may identify applications that a user is using on his/her device, or in a virtual environment he/she uses, and may test the compatibility of one or more of those applications for compatibility with an upgraded operating system or virtual environment. For example, applications stored on a user's device that uses Windows Vista operating system, may be tested for compatibility with Windows 7 operating system, in anticipation of upgrading the user's operating system. In an example using a virtual environment, a user may wish to upgrade from one version of XenDesktop to another, and applications the user uses in the current version of XenDesktop may be tested for compatibility with the upgraded version of XenDesktop before upgrading the user's virtual environment.

It should be recognized that the above disclosure has applicability to a wide range of computing environments. For example, the systems and methods disclosed herein could be used to test the compatibility of applications with physical computing platforms (e.g., devices using a particular operating system, combination of applications, etc. on a local computer), virtual computing platforms (devices using a particular operating system, combination of applications, etc. in a virtual desktop, such as XenDesktop), or any combination of physical and virtual computing platforms. The systems and methods disclosed herein could be used to test application compatibility with computing platforms using any combination of physical, virtual and/or cloud-based environments.

The methods disclosed herein may be implemented as a computer program product, i.e., a computer program tangibly embodied in an information carrier, e.g., in a non-transitory machine-readable storage device or in a propagated signal, for execution by, or to control the operation of, a data processing apparatus, e.g., a programmable processor, a computer, or multiple computers. A computer program can be written in any form or programming language, including compiled or interpreted languages, and it can be deployed in any form, including as a stand-alone program or as one or more modules, one or more components, one or more subroutines, or one or more other units suitable for use in a computing environment. A computer program can be deployed to be executed on one computer or on multiple computers at one site or distributed across multiple sites and interconnected by a communication network.

In the preceding specification, the subject matter has been described with reference to specific exemplary embodiments. It will, however, be evident that various modifications and changes may be made without departing from the broader spirit and scope of the subject matter as set forth in the claims that follow. The specification and drawings are accordingly to be regarded as illustrative rather than restrictive. Other embodiments may be apparent to those skilled in the art from consideration of the specification and practice of the embodiments disclosed herein.

What is claimed is:

1. A computer-implemented system for analyzing software compatibility, comprising: a memory device configured to store instructions; and
one or more processors configured to execute the instructions to:
receive a selection of an application from one or more applications presented in an operator interface;
receive a selection of a user identity from a plurality of user identities in the operator interface;
identify a computing platform implemented on a device associated with the selected user identity;
determine whether the selected application is compatible with the computing platform;
provide a compatibility indicator for display in the operator interface based on the determination and to indicate that the selected application is not compatible with the computing platform;
receive an indication that the compatibility indicator has been selected; and
provide for display a reason that the selected application and the computing platform are not compatible.

2. The system of claim 1, wherein the compatibility indicator indicates that the application is not compatible with the computing platform, and the one or more processors further execute the instructions to:
present, in the operator interface, one or more of:
the reason that the application and the computing platform are not compatible; and
a solution for making the application and the computing platform compatible.

3. The system of claim 1, wherein the compatibility indicator indicates that the application is compatible with the computing platform.

4. The system of claim 1, wherein the device is associated with a first user, the user identity is associated with the first user, the computing platform is a first computing platform, and the compatibility indicator is a first compatibility indicator, and the one or more processors further execute the instructions to:
receive an indication that a second user identity has been selected from the listing of user identities presented in the operator interface;
identify a second computing platform implemented on a device associated with the second user identity;
determine whether the application is compatible with the second computing platform;
and provide a second compatibility indicator for display in the operator interface based on the
determination of whether the application is compatible with the second computing platform.

5. The system of claim 1, wherein the device associated with a first user, the user identity is included in a user group of which the first user is a member, the computing platform is a first computing platform, and the compatibility indicator is a first compatibility indicator, and the one or more processors further execute the instructions to:
identify a second computing platform implemented on a device associated with a second user within the user group;
determine whether the application is compatible with the second computing platform;
and provide a second compatibility indicator for display in the operator interface based on the determination of whether the application is compatible with the second computing platform.

6. The system of claim 1, wherein the user identity is an identity included in a first user group of which the user is a member, the computing platform is a first computing platform, and the compatibility indicator is a first compatibility indicator, and the one or more processors further execute the instructions to:
receive an indication that a second user group has been selected from the listing of user identities presented in the operator interface;
identify a second computing platform implemented on a device of a user within the second user group;
determine whether the application is compatible with the second computing platform;
and provide a second compatibility indicator for display in the operator interface based on the
determination of whether the application is compatible with the second computing platform.

7. The system of claim 3, wherein the one or more processors further execute the instructions to receive an indication of a selection to test the application in a virtual environment that emulates the computing platform.

8. The system of claim 1, wherein the one or more processors further execute the instructions to:
organize a plurality of data points associated with the application into a plurality of elements;
compare the plurality of elements with a plurality of elements associated with one or more applications that have already been analyzed for compatibility with the computing platform; and
identify whether the application is compatible with the computing platform based on the comparison.

9. A computer-implemented method for analyzing software compatibility, the method performed by one or more processors and comprising:
receiving an indication of a selection of an application from one or more applications presented in an operator interface;
receiving a selection of a user identity from a plurality of user identities presented in the operator interface;
identifying a computing platform implemented on a device associated with the selected user identity; determining whether the selected application is compatible with the computing platform;
providing a compatibility indicator for display in the operator interface based on the determination and to indicate that the selected application is not compatible with the computing platform;
receiving an indication that the compatibility indicator has been selected; and
providing for display a reason that the selected application and the computing platform are not compatible.

10. The method of claim 9, wherein the compatibility indicator indicates that the application is not compatible with the computing platform, further comprising:
presenting, in the operator interface, one or more of:
a reason that the application and the computing platform are not compatible; and a solution for making the application and the computing platform compatible.

11. The method of claim 9, wherein the compatibility indicator indicates that the application is compatible with the computing platform.

12. The method of claim 9, wherein the device is associated with a first user, the user identity is associated with the first user, the computing platform is a first computing platform, and the compatibility indicator is a first compatibility indicator, further comprising:
receiving an indication that a second user identity has been selected from the listing of user identities presented in the operator interface;
identifying a second computing platform implemented on a device associated with the second user identity;
determining whether the application is compatible with the second computing platform; and
providing a second compatibility indicator for display in the operator interface based on the determination of whether the application is compatible with the second computing platform.

13. The method of claim 9, wherein the device associated with a first user, the user identity is included in a user group of which the first user is a member, the computing platform is a first computing platform, and the compatibility indicator is a first compatibility indicator, further comprising:
identifying a second computing platform implemented on a device associated with a second user within the user group;
determining whether the application is compatible with the second computing platform; and
providing a second compatibility indicator for display in the operator interface based on the determination of whether the application is compatible with the second computing platform.

14. The method of claim 9, wherein the user identity is an identity included in a first user group of which the user is a member, the computing platform is a first computing platform, and the compatibility indicator is a first compatibility indicator, further comprising:
receiving an indication that the second user group has been selected from the listing of user identities presented in the operator interface;
identifying a second computing platform implemented on a device of a user within the second user group;
determining whether the application is compatible with the second computing platform; and
providing a second compatibility indicator for display in the operator interface based on the determination of whether the application is compatible with the second computing platform.

15. The method of claim 11, further comprising receiving an indication of a selection to test the application in a virtual environment that emulates the computing platform.

16. The method of claim 9, wherein determining whether the application is compatible with the computing platform further comprises:
organizing a plurality of data points associated with the application into a plurality of elements;
comparing the plurality of elements with a plurality of elements associated with one or more applications that have already been analyzed for compatibility with the computing platform; and
identifying whether the application is compatible with the computing platform based on the comparison.

17. A non-transitory computer-readable medium storing instructions that are executable by one or more processors to cause the one or more processors to perform a method, the method comprising:
receiving an indication of a selection of an application from one or more applications presented in an operator interface;
receiving selection of a user identity from a plurality of user identities presented in the operator interface;

identifying a computing platform implemented on a device associated with the selected user identity;

determining whether the selected application is compatible with the computing platform;

providing a compatibility indicator for display in the operator interface based on the determination and to indicate that the selected application is not compatible with the computing platform;

receiving an indication that the compatibility indicator has been selected; and providing for display a reason that the selected application and the computing platform are not compatible.

18. The non-transitory computer-readable medium of claim 17, wherein the compatibility indicator indicates that the application is not compatible with the computing platform and further comprising instructions that are executable to cause the one or more processors to perform:

presenting, in the operator interface, one or more of:

a reason that the application and the computing platform are not compatible; and a solution for making the application and the computing platform compatible.

19. The non-transitory computer-readable medium of claim 17, wherein the device is associated with a first user, the user identity is associated with the first user, the computing platform is a first computing platform, and the compatibility indicator is a first compatibility indicator, and further comprising instructions that are executable to cause the one or more processors to perform:

receiving an indication that a second user identity has been selected from the listing of user identities presented in the operator interface;

identifying a second computing platform implemented on a device associated with the second user identity;

determining whether the application is compatible with the second computing platform;

and providing a second compatibility indicator for display in the operator interface based on the determination of whether the application is compatible with the second computing platform.

20. The non-transitory computer-readable medium of claim 17, wherein the device associated with a first user, the user identity is included in a user group of which the first user is a member, the computing platform is a first computing platform, and the compatibility indicator is a first compatibility indicator, and further comprising instructions that are executable to cause the one or more processors to perform:

identifying a second computing platform implemented on a device associated with a second user within the user group;

determining whether the application is compatible with the second computing platform; and providing a second compatibility indicator for display in the operator interface based on the determination of whether the application is compatible with the second computing platform.

\* \* \* \* \*